United States Patent
Nakashin

(10) Patent No.: US 9,762,869 B2
(45) Date of Patent: Sep. 12, 2017

(54) IMAGE PROCESSING DEVICE, PROJECTOR, AND METHOD OF CONTROLLING PROJECTOR

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/381,345

(22) PCT Filed: Mar. 19, 2013

(86) PCT No.: PCT/JP2013/001881
§ 371 (c)(1),
(2) Date: Aug. 27, 2014

(87) PCT Pub. No.: WO2013/140795
PCT Pub. Date: Sep. 26, 2013

(65) Prior Publication Data
US 2015/0015853 A1    Jan. 15, 2015

(30) Foreign Application Priority Data

Mar. 21, 2012 (JP) .................................. 2012-063283

(51) Int. Cl.
*H04N 9/31* (2006.01)
*G03B 17/54* (2006.01)

(52) U.S. Cl.
CPC ......... *H04N 9/3182* (2013.01); *H04N 9/3185* (2013.01); *H04N 9/3188* (2013.01); *H04N 9/3194* (2013.01); *G03B 17/54* (2013.01)

(58) Field of Classification Search
CPC .. H04N 9/3194; H04N 9/3185; H04N 9/3188; H04N 9/3182; G03B 21/147;
(Continued)

(56) References Cited

U.S. PATENT DOCUMENTS 5,532,765 A    7/1996 Inoue et al.
6,061,102 A    5/2000 Sheppard et al.
(Continued)

FOREIGN PATENT DOCUMENTS

EP    0 703 714 A2    3/1996
JP    A-7-15692    1/1995
(Continued)

OTHER PUBLICATIONS

Feb. 2, 2016 Office Action issued in U.S. Appl. No. 14/381,421.
(Continued)

*Primary Examiner* — Christina Riddle
*Assistant Examiner* — Christopher Lamb, II
(74) *Attorney, Agent, or Firm* — Oliff PLC

(57) ABSTRACT

A detection image generation section generates a detection image, which is an image for detection a state of a projection image, and includes a plurality of detection image parts, and background images covering respective peripheries of the detection image parts. Each of the detection image parts includes a plurality of regions with respective luminance values different from each other, and the background images have luminance values lower than the luminance values of the detection image parts. The detection image generation section changes at least one of a luminance distribution of each of the detection image parts of the detection image to be generated and a size of each of the background images so that a luminance distribution of each of the detection image parts of the taken detection image obtained by imaging is approximated to a luminance distribution of corresponding one of the detection image parts of the detection image.

8 Claims, 15 Drawing Sheets

(58) Field of Classification Search
CPC ........ G03B 17/54; G03B 21/14; G03B 21/26; G06T 5/006; G06T 2207/30204
USPC .............................. 353/85, 69, 70; 348/745
See application file for complete search history.

(56) References Cited

U.S. PATENT DOCUMENTS

| | | | |
|---|---|---|---|
| 6,198,542 | B1 | 3/2001 | Tabata |
| 6,292,171 | B1* | 9/2001 | Fu .......................... G06F 3/0386 345/156 |
| 7,016,058 | B1 | 3/2006 | Tabata |
| 7,274,382 | B2* | 9/2007 | Plut ....................... G06F 9/4443 345/660 |
| 7,313,612 | B1 | 12/2007 | Kakimoto |
| 7,347,564 | B2 | 3/2008 | Matsumoto et al. |
| 7,893,393 | B2 | 2/2011 | Webb et al. |
| 8,529,069 | B2 | 9/2013 | Oka |
| 8,804,504 | B1 | 8/2014 | Chen |
| 8,807,762 | B2* | 8/2014 | Uchiyama .............. G03B 21/00 345/589 |
| 8,928,554 | B2 | 1/2015 | Hine |
| 9,122,138 | B2 | 9/2015 | Furui |
| 2002/0044275 | A1* | 4/2002 | Kitabayashi ....... G01M 11/0264 356/124 |
| 2002/0108108 | A1 | 8/2002 | Akaiwa et al. |
| 2003/0142883 | A1* | 7/2003 | Ishii ...................... G06F 3/1446 382/284 |
| 2004/0201825 | A1 | 10/2004 | Kobayashi et al. |
| 2007/0046901 | A1* | 3/2007 | Kuno .................... G03B 21/14 353/69 |
| 2007/0132893 | A1* | 6/2007 | Miyazawa ........... H04N 9/3182 348/745 |
| 2007/0177037 | A1 | 8/2007 | Kurata |
| 2008/0100806 | A1 | 5/2008 | Inazumi |
| 2008/0147912 | A1 | 6/2008 | Akaiwa et al. |
| 2008/0234843 | A1 | 9/2008 | Akaiwa et al. |
| 2010/0026963 | A1* | 2/2010 | Faulstich ........... G01B 11/2513 353/40 |
| 2010/0309210 | A1 | 12/2010 | Akaiwa et al. |
| 2011/0150356 | A1* | 6/2011 | Jo ........................... G06T 5/002 382/269 |
| 2011/0210977 | A1 | 9/2011 | Akaiwa et al. |
| 2012/0127323 | A1* | 5/2012 | Kasuya .................. G03B 17/54 348/189 |
| 2012/0128224 | A1 | 5/2012 | Yu et al. |
| 2012/0218523 | A1 | 8/2012 | Mizuno et al. |
| 2013/0077869 | A1 | 3/2013 | Teshima et al. |
| 2013/0222409 | A1 | 8/2013 | Akaiwa et al. |
| 2013/0235212 | A1 | 9/2013 | Nakashin et al. |
| 2014/0115027 | A1 | 4/2014 | Akaiwa et al. |
| 2014/0168525 | A1* | 6/2014 | Hasegawa et al. .... H04N 9/317 348/745 |

FOREIGN PATENT DOCUMENTS

| | | |
|---|---|---|
| JP | H09-198206 A | 7/1997 |
| JP | 2001-175576 A | 6/2001 |
| JP | 2001-255974 A | 9/2001 |
| JP | 2002-057964 A | 2/2002 |
| JP | A-2005-159426 | 6/2005 |
| JP | A-2006-60447 | 3/2006 |
| JP | 2007-166271 A | 6/2007 |
| JP | A-2011-176629 | 9/2011 |
| JP | 2012-178674 A | 9/2012 |
| JP | WO 2013024705 A1 * | 2/2013 ............. H04N 9/317 |

OTHER PUBLICATIONS

Oct. 7, 2015 Office Action issued in U.S. Appl. No. 14/381,421.
U.S. Appl. No. 14/381,421, filed Aug. 27, 2014 in the name of Nakashin.
Jul. 30, 2013 International Search Report issued in International Patent Application No. PCT/JP2013/001880.
International Search Report issued in International Patent Application No. PCT/JP2013/001881 mailed Jul. 30, 2013.

* cited by examiner

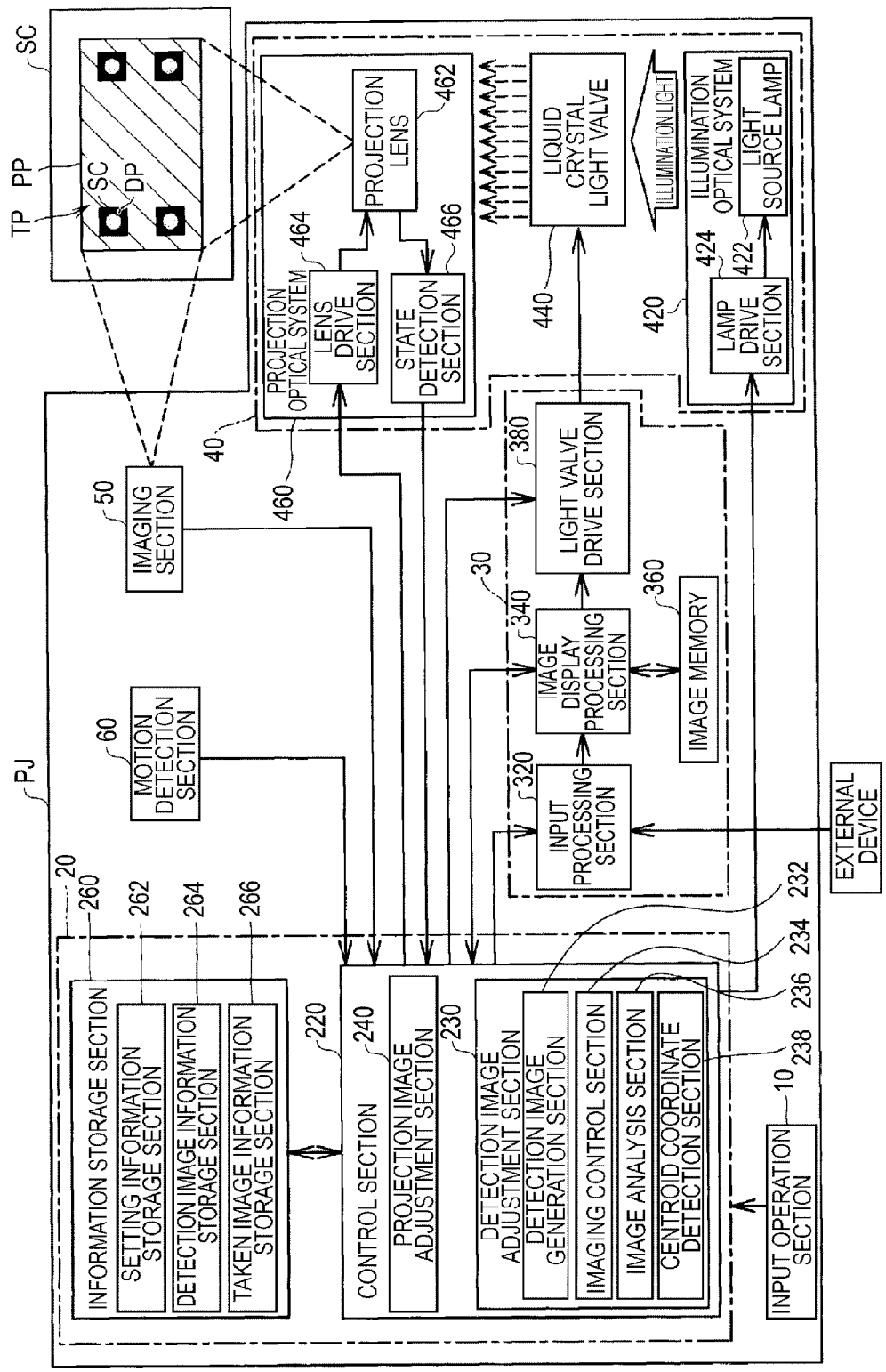
[Fig. 1]

[Fig. 2]
(A)
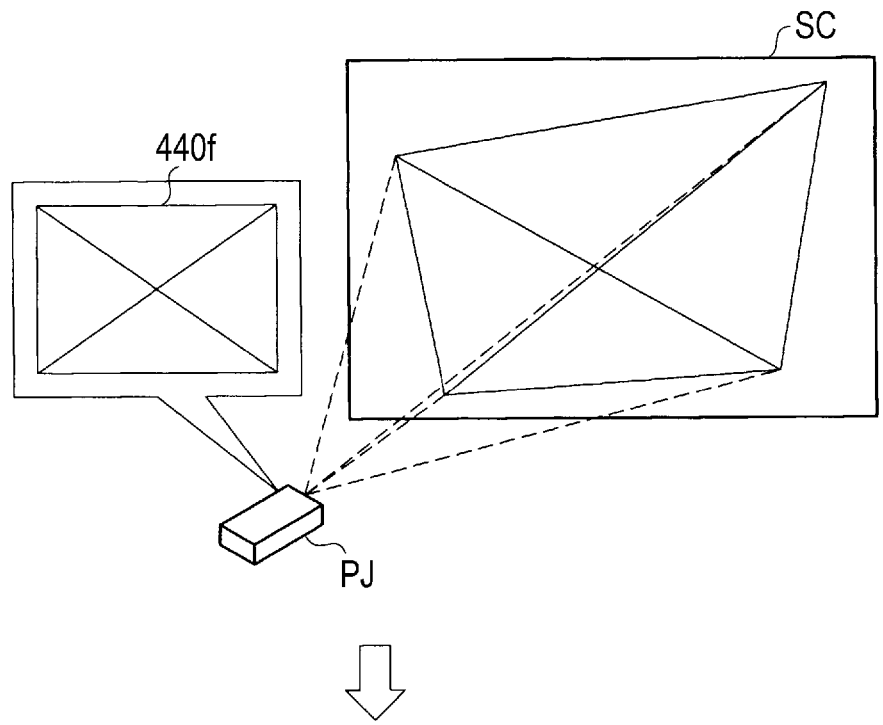
(B)
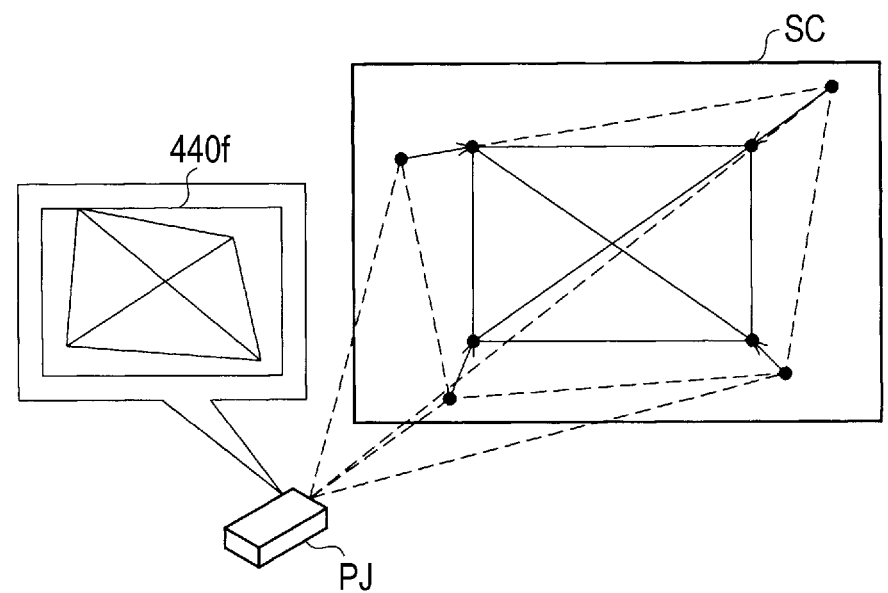

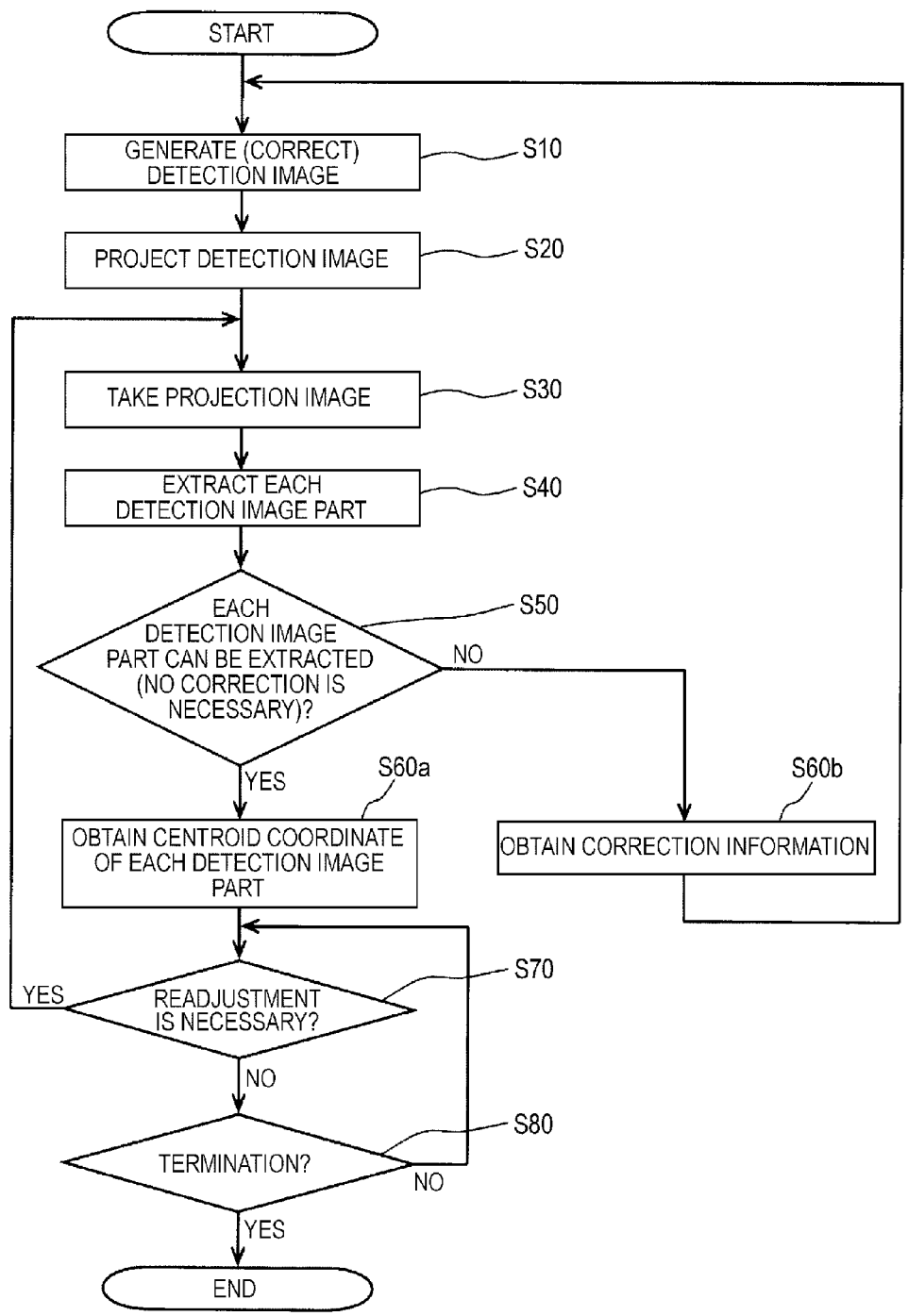

[Fig. 4A]
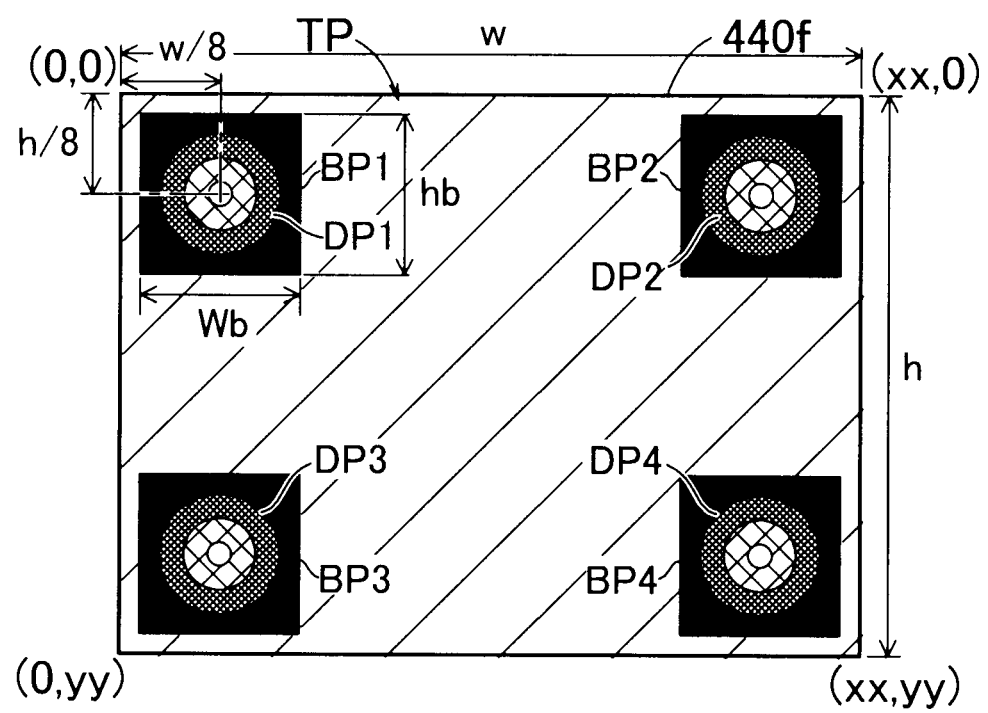

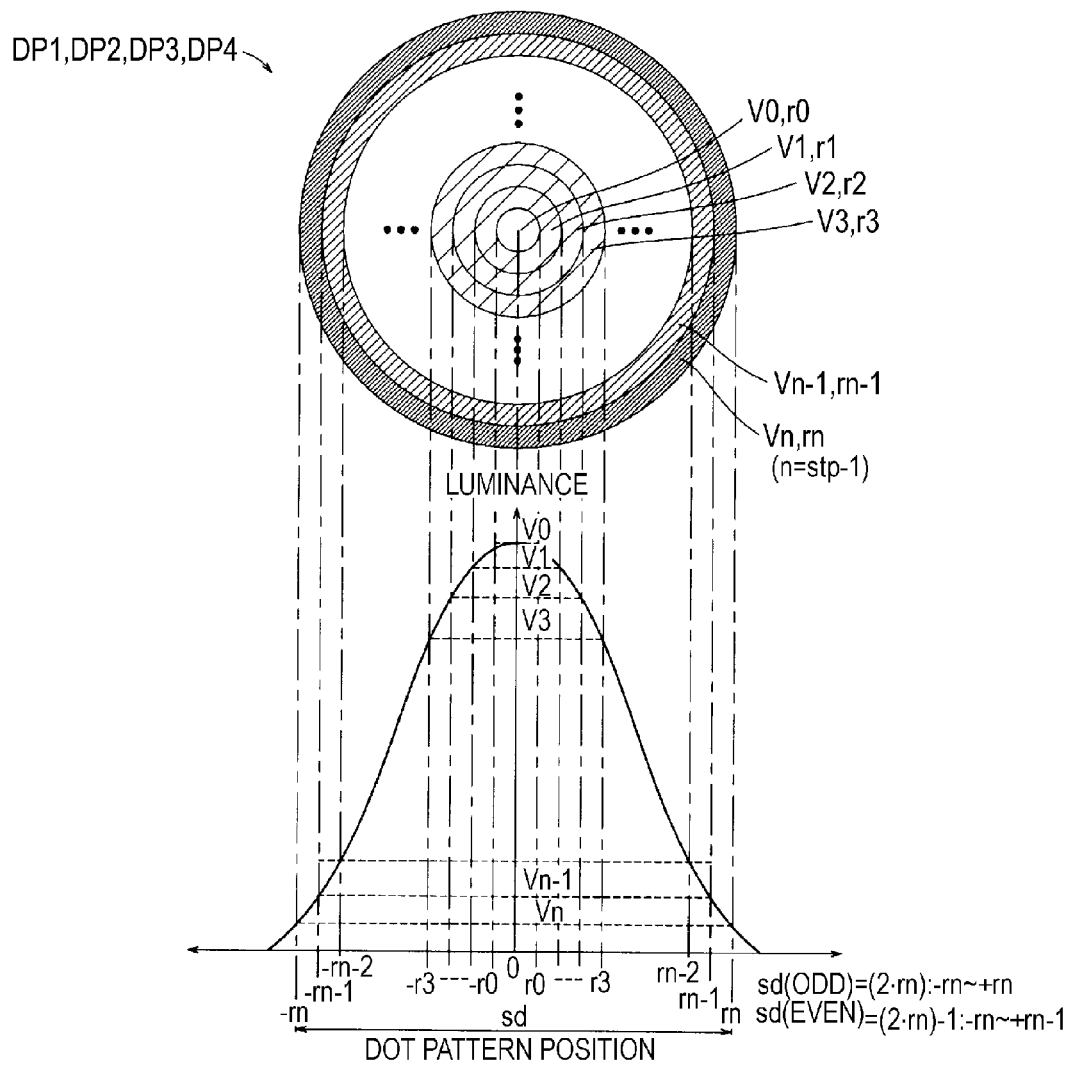

[Fig. 5]
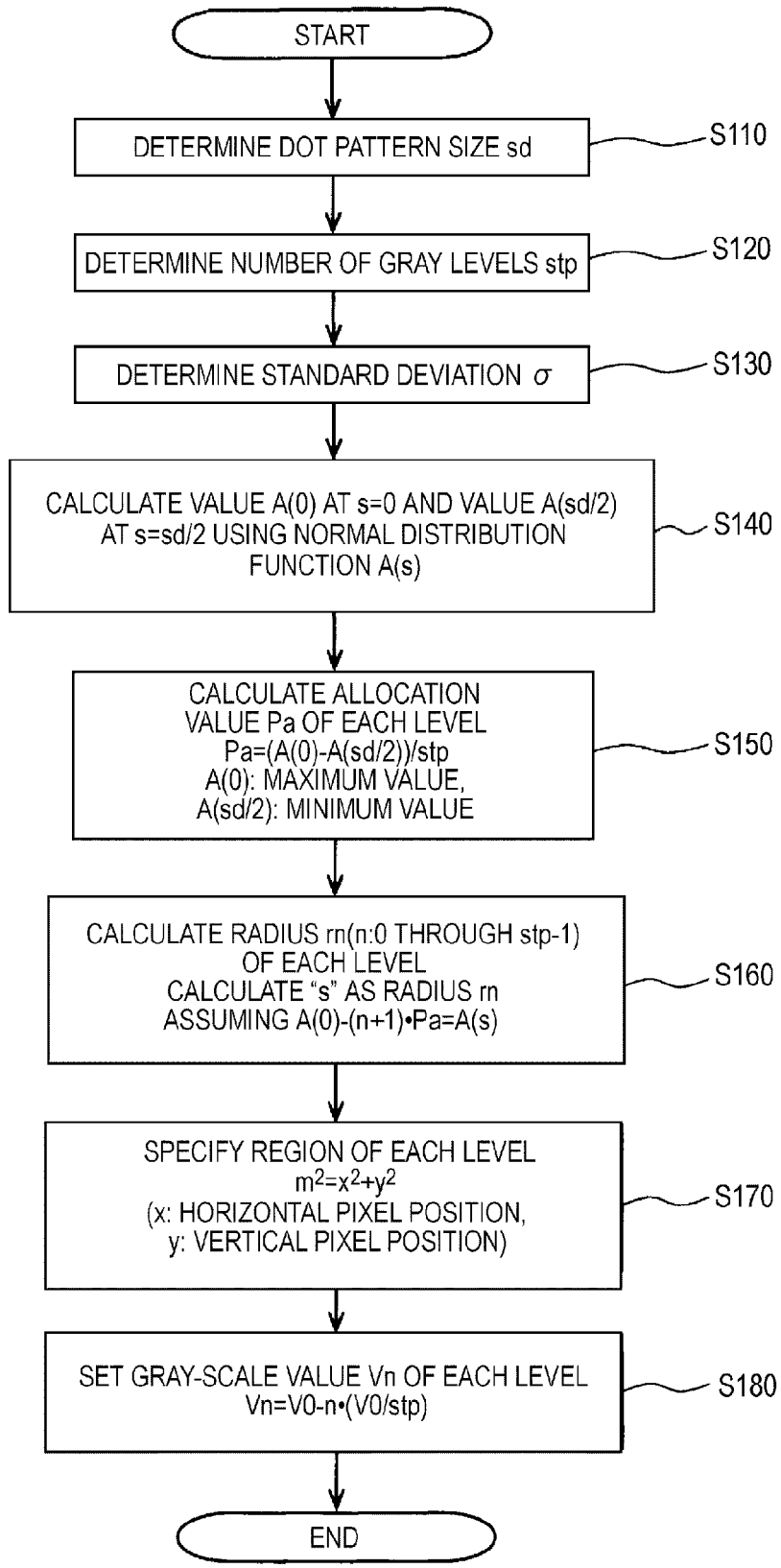

[Fig. 6]
(A)
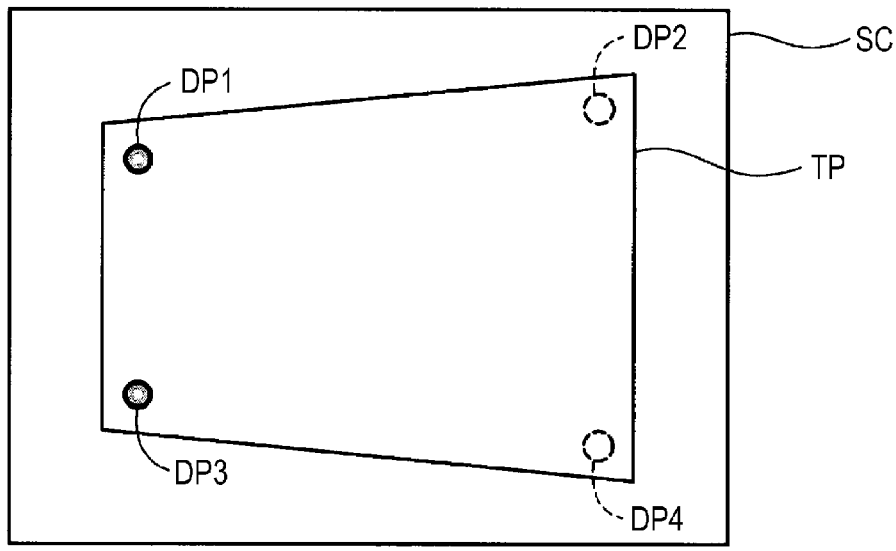
- IMAGING (S30)
- CORRECTION OF DETECTION IMAGE (S60b, S50)
- REPROJECTION OF DETECTION IMAGE (S20)
(B)
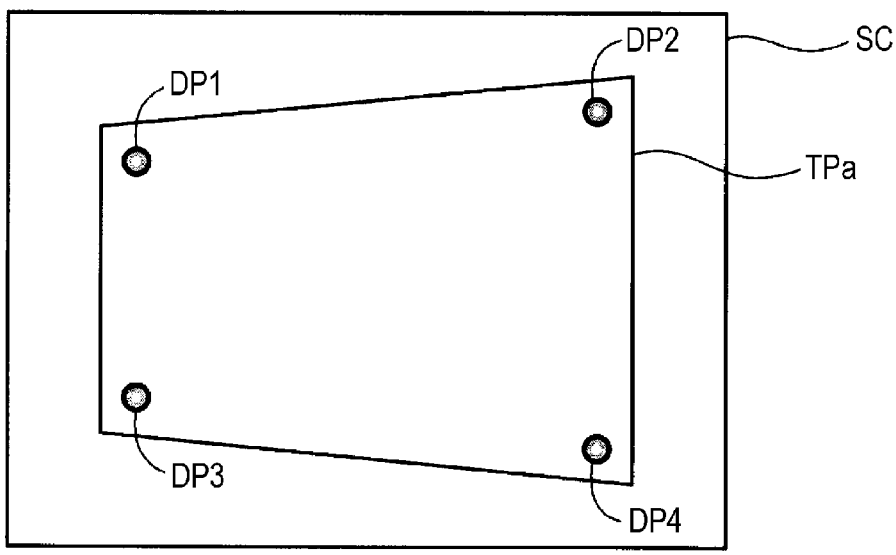

[Fig. 7]
(A)
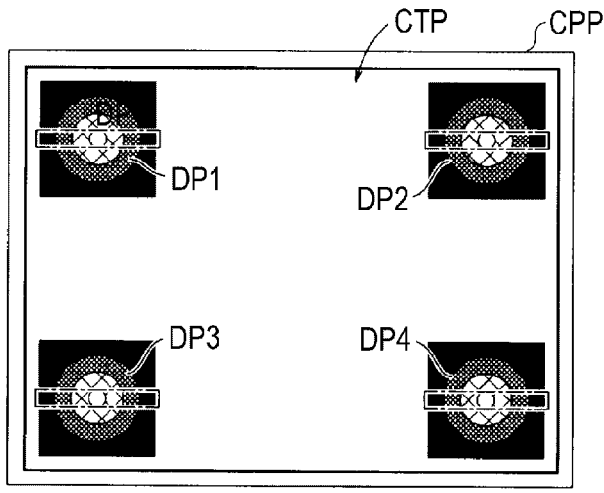
(B)
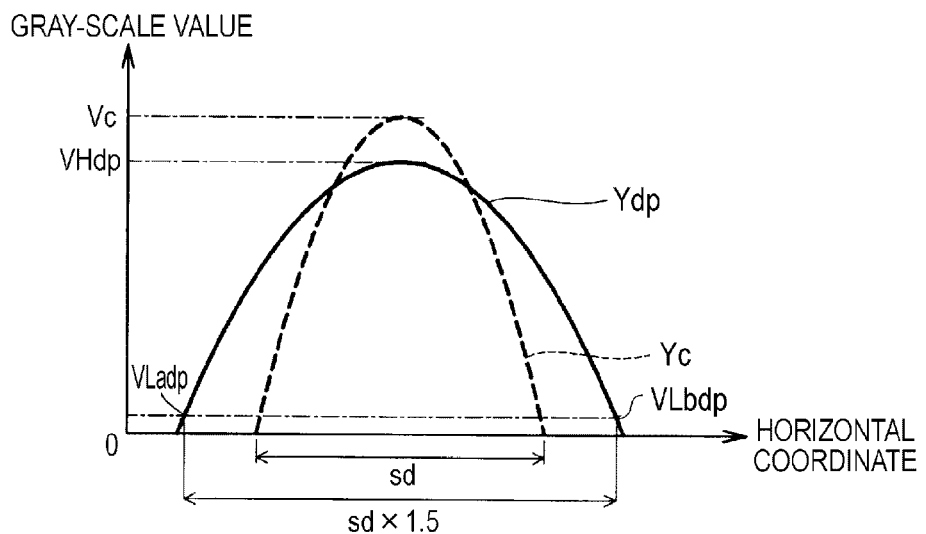

[Fig. 8]
(A)
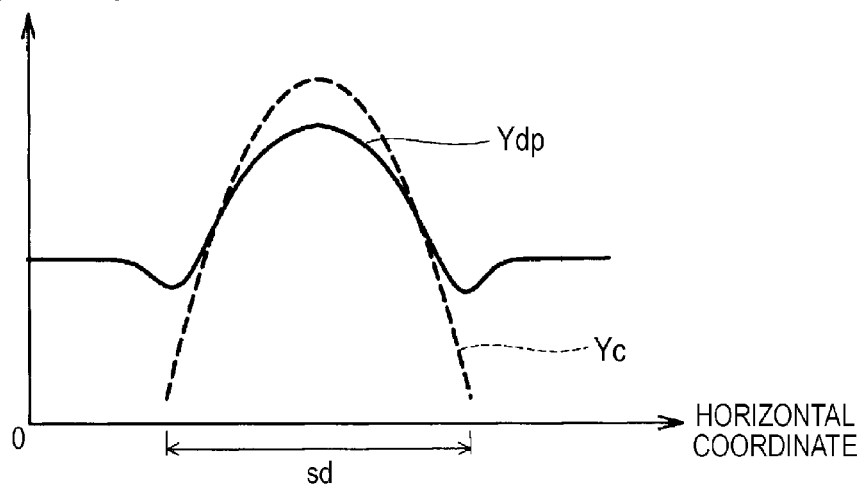
(B)
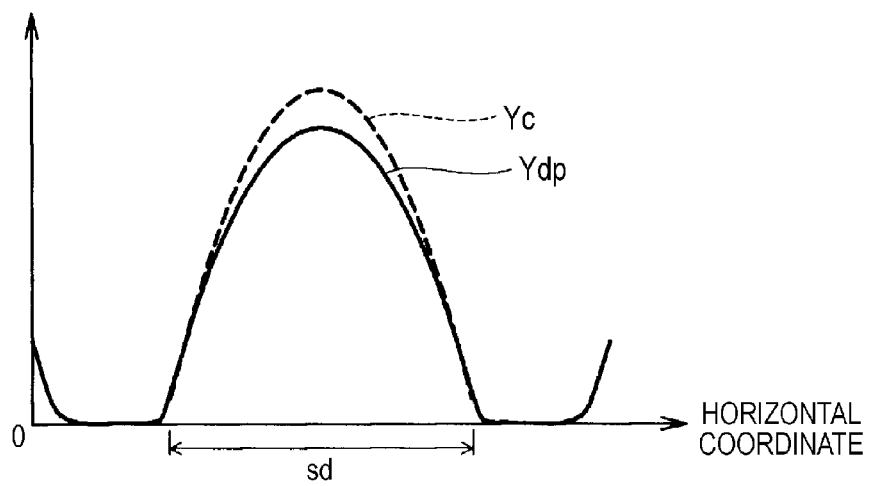

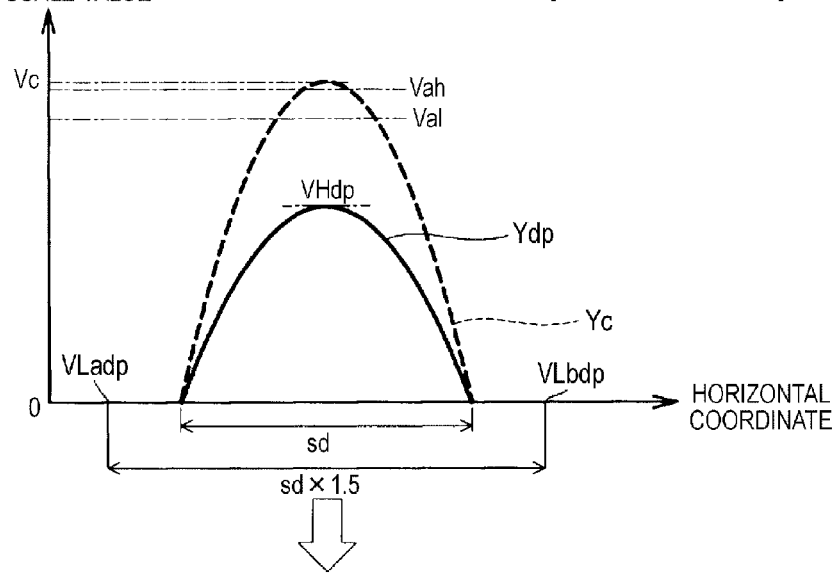
[Fig. 9] GRAY-SCALE VALUE [DARKLY EXTRACTED]
LUMINANCE OF DOT PATTERN: SET BRIGHTER
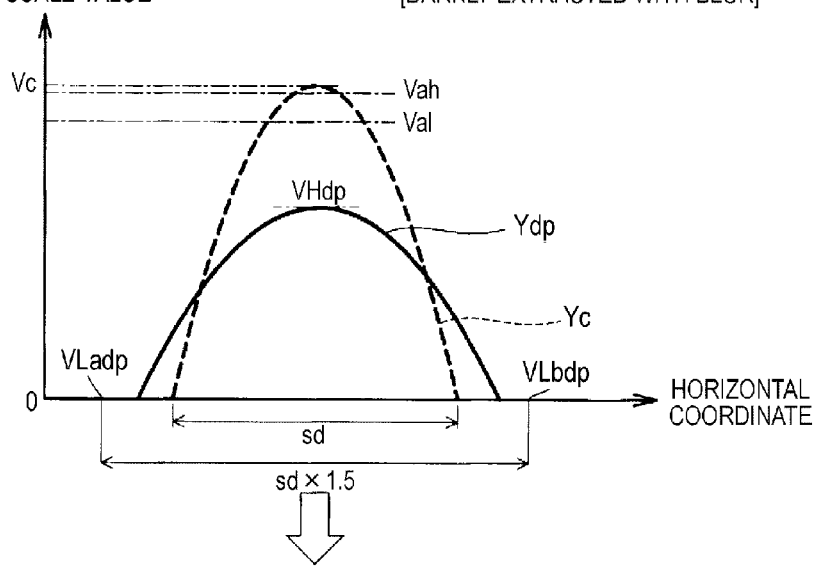
[Fig. 10] GRAY-SCALE VALUE [DARKLY EXTRACTED WITH BLUR]
SIZE OF BACKGROUND IMAGE TO SIZE OF DOT PATTERN: SET LARGER
(or CENTER LUMINANCE OF DOT PATTERN: SET BRIGHTER)

[Fig. 11]
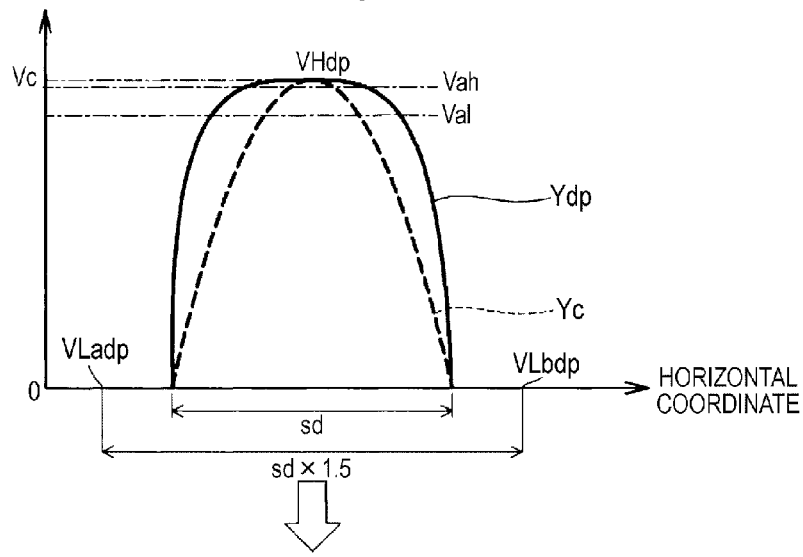
LUMINANCE OF DOT PATTERN: SET SLIGHTLY DARKER
or
SIZE OF DOT PATTERN: SET SMALLER (SIZE OF BACKGROUND IMAGE: SET SMALLER)
[Fig. 12]
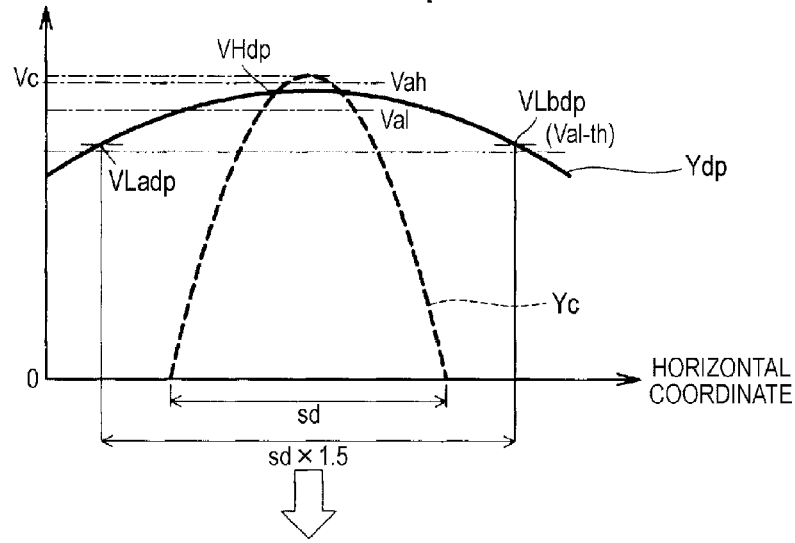
SIZE OF BACKGROUND IMAGE TO SIZE OF DOT PATTERN: SET LARGER
or
LUMINANCE OF DOT PATTERN: SET DARKER IN THE PERIPHERY
or
SIZE OF DOT PATTERN: SET SMALLER (SIZE OF BACKGROUND IMAGE: SET SMALLER)

[Fig. 13A]
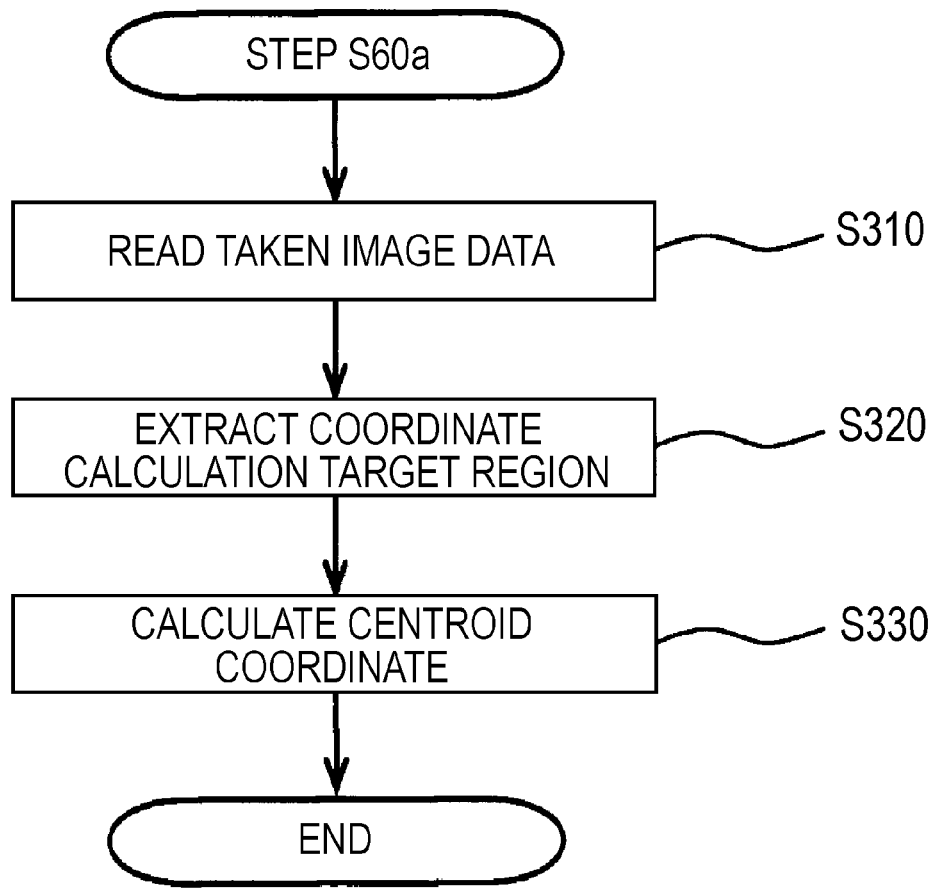

[Fig. 13B]
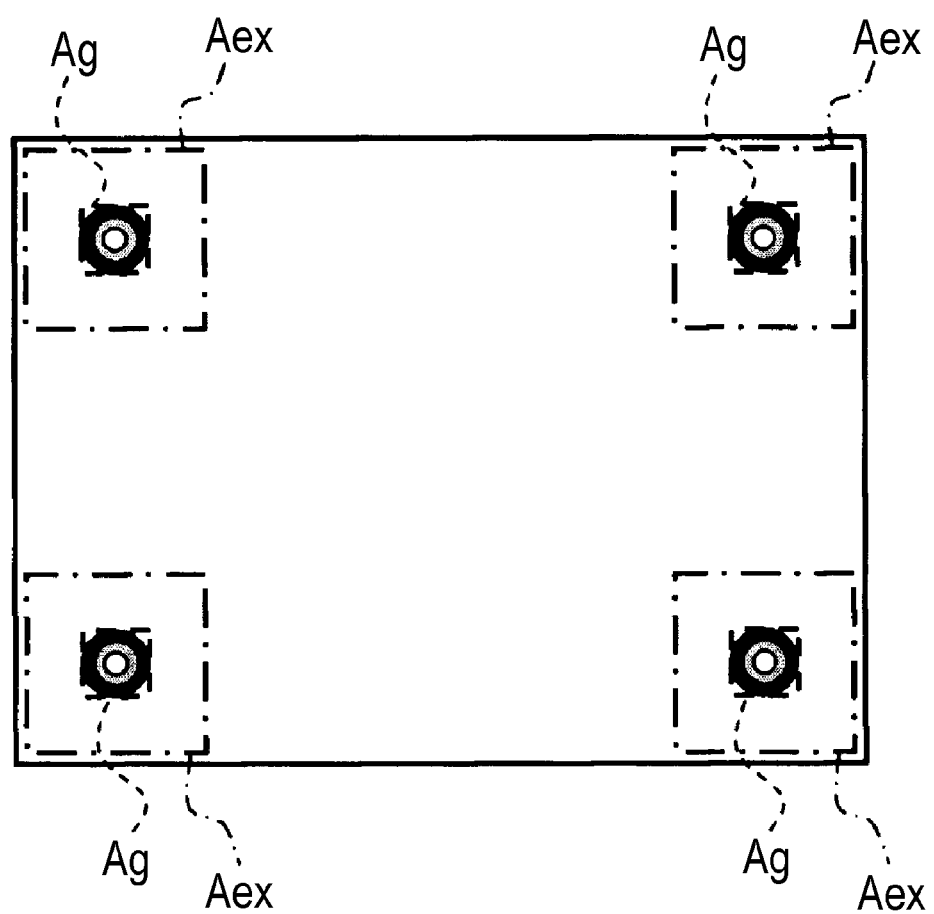

[Fig. 14]
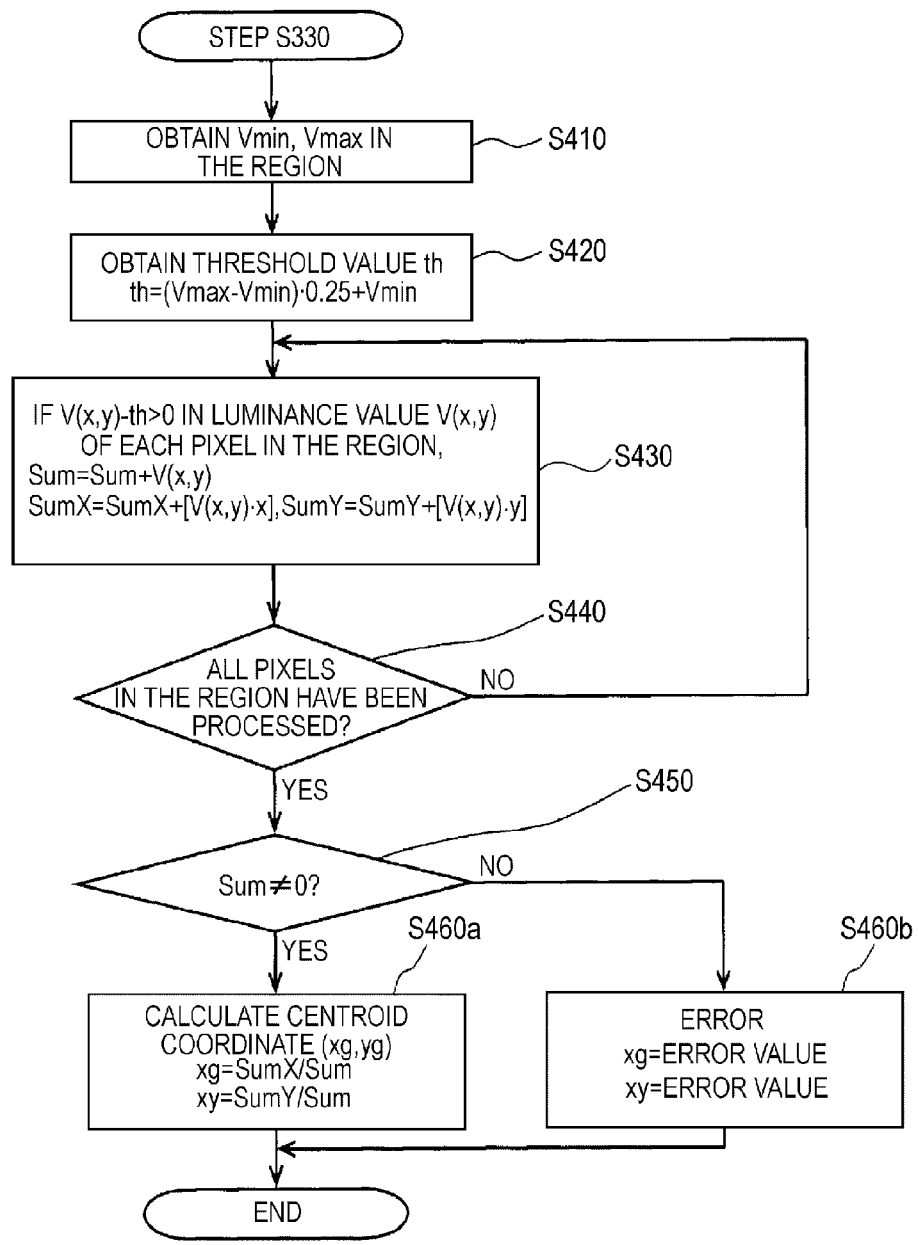

[Fig. 15]
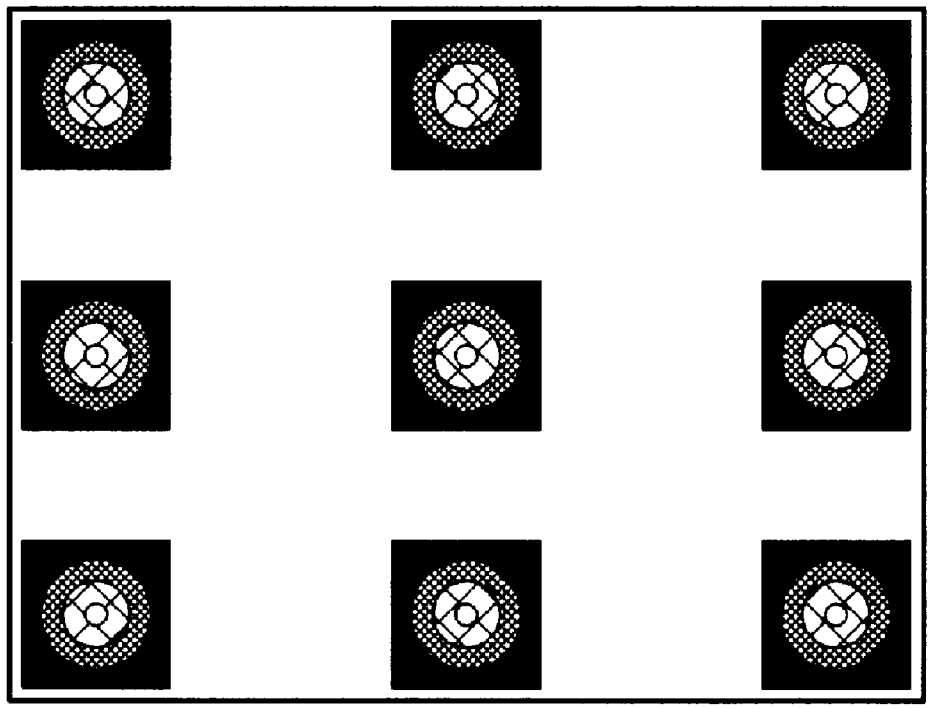
[Fig. 16]
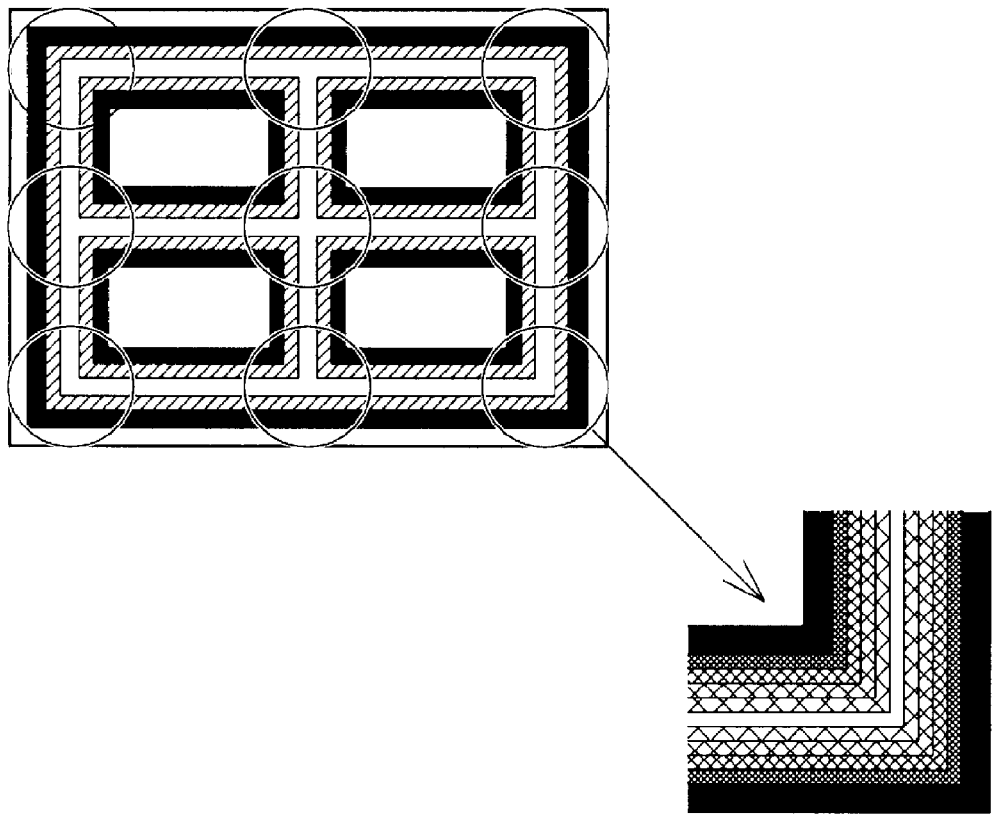

IMAGE PROCESSING DEVICE, PROJECTOR, AND METHOD OF CONTROLLING PROJECTOR

CROSS REFERENCE TO RELATED APPLICATIONS

The entire disclosure of Japanese Patent Application No. 2012-063283, filed Mar. 21, 2012 is expressly incorporated by reference herein.

TECHNICAL FIELD

The present invention relates to a projector for displaying an image by projecting the image on a projection surface.

BACKGROUND ART

In the case of displaying an image by projecting the image on a projection surface such as a screen using a projector, an adjustment corresponding to a relative positional relationship between the projector and the projection surface is generally performed. As such an adjustment, there can be cited a focus adjustment for adjusting the shift of the focus of the image (hereinafter also referred to as a "projection image") projected on the projection surface, a keystone correction for correcting the distortion (hereinafter also referred to as a "keystone distortion") of the image range of the projection image, and so on.

The focus adjustment and the keystone correction described above are performed by taking an image of a test pattern projected on the projection surface with a camera installed in the projector, and then obtaining the information necessary for the focus adjustment and the keystone correction based on the image (hereinafter also referred to as a "taken image") thus taken (see PTL 1 and PTL 2).

In PTL 1, the operation is as simply explained below. Specifically, the light with even luminance is projected from the projector toward the screen, the reflected light from the screen is received, and the centroid position of the illuminance of the received light is detected. Then, the tilt angle of the screen is calculated based on the centroid position thus detected, and then the keystone distortion is corrected in accordance with the tilt angle thus calculated.

In PTL 2, the operation is as simply explained below. Specifically, focusing attention to four sides (upper, lower, right, and left sides) of the screen in the image taken by the imaging section, the ratios between the lengths of the two sides opposed to each other, namely the upper and lower sides and the right and left sides, are calculated. The ratio between the intensities of the lights respectively projected on the upper and lower areas is calculated based on the ratio between the upper and lower sides, and similarly, the ratio between the intensities of the lights respectively projected on the right and left areas is calculated based on the ratio between the right and left sides. Then, the test pattern based on the ratios of the light intensities is projected.

CITATION LIST

Patent Literature

[PTL 1]
JP-A-2005-159426
[PTL 2]
JP-A-2011-176629

SUMMARY OF INVENTION

Technical Problem

However, in PTL 1 mentioned above, there arise a problem that the detection accuracy of the reflected light might drop depending on the positional relationship between the projector and the screen, a problem that the detection accuracy of the reflected light is significantly different between the locations, and so on. For example, in the case in which the screen is tilted, since the light intensity decreases in inverse proportion to the square of the distance from the light source, the longer the distance (hereinafter also referred to as a "projection distance") of the light projected by the projector to the screen becomes, the more saliently the drop of the illuminance of the reflected light received from the screen grows, and the more dramatic drop of the accuracy of the reflected light received results. Therefore, the sharper the tilt becomes, the more significant the drop of the illuminance of the reflected light received corresponding to the light with longer projection distance is, and the accuracy of the reflected light received drops to cause the calculation accuracy of the centroid position to drop as a result. Further, in some cases, the angle of the projection with respect to the screen is different even if the projection distance is the same, and there is a possibility of failing to detect the difference accurately.

Further, PTL 2 mentioned above is premised on the concept that the light intensity variation between the two sides opposed to each other is a gradational variation based on the ratio between the lengths of the sides. However, according to the verification with an actual measurement test, it is confirmed that the gradational variation might fail to occur in some cases. It is possible that generation of the light intensity variation due to the contamination in the projection surface of the screen, the distortion of the screen, and so on is the factor thereof. Further, if the gradational variation based on the ratio between the lengths of the sides fails to occur as described above, there arises a problem that degradation of the extraction accuracy and the detection accuracy of the test pattern is incurred. Further, PTL 2 is premised on the fact that the imaging section is integrated with the projector, and in the case of the separate imaging section not installed in the projector, the error between the positional relationship between the projector and the screen and the positional relationship between the imaging section and the screen is accumulated, and there arises a problem that the possibility of incurring the degradation of the detection accuracy (the extraction accuracy) of the test pattern rises.

Solution to Problem

An advantage of some aspects of the invention is to provide a technology of further improving the extraction accuracy and the detection accuracy of the detection image projected on the projection surface compared to the related art.

The invention can be implemented as the following forms or application examples.

APPLICATION EXAMPLE 1

This application example is directed to an image processing device used for a projector adapted to display an image by projecting the image on a projection surface, and including a detection image generation section adapted to generate a detection image, which is an image adapted to detect a state of a projection image displayed on the projection surface, and includes a plurality of detection image parts, and a background image adapted to cover respective peripheries of the detection image parts, each of the detection image parts includes a plurality of regions having respective luminance values different from each other, the background image has a luminance value lower than the luminance values of the detection image parts, and the detection image generation section changes at least one of a luminance distribution of each of the detection image parts of the detection image to be generated and a size of the background image so that a luminance distribution of each of the detection image parts included in a taken detection image, which is taken by imaging the detection image projected on the projection surface, is approximated to a luminance distribution of corresponding one of the detection image parts of the detection image.

In this image processing device, the detection image is composed of a plurality of detection image parts and a background image covering the respective peripheries of the detection image parts, and the background image is formed as an image having a lower luminance value than the luminance values of the detection image parts. Therefore, it is possible to inhibit the luminance value of the periphery of the background image from affecting the luminance value of the detection image part. Further, the detection image parts are each formed as an image including a plurality of regions with respective luminance values different from each other, and are therefore advantageous to obtaining the centroid of the detection image part with accuracy. Further, at least one of the luminance distribution of each of the detection image parts of the detection image to be generated and the size of the background image is changed so that the luminance distribution of each of the detection image parts included in the taken detection image is approximated to the luminance distribution of corresponding one of the detection image parts of the detection image. Therefore, it is possible to improve the extraction accuracy and the detection accuracy of each of the detection image parts included in the taken detection image, and it becomes possible to improve the extraction accuracy and the detection accuracy of the detection image.

APPLICATION EXAMPLE 2

This application example is directed to the image processing device according to Application Example 1, wherein the detection image generation section changes at least one of the luminance distribution of each of the detection image parts of the detection image to be generated and the size of the background image so that a gray-scale pattern of the luminance of each of the detection image parts included in the taken detection image fulfills a requirement for determining that the correction of the detection image is unnecessary. In the this image processing device, by changing at least one of the gray-scale pattern of the luminance of each of the detection image parts of the detection image to be generated and the size of the background image so that the gray-scale pattern of the luminance of each of the detection image parts included in the taken detection image fulfills the requirement, it is possible to easily approximate the luminance distribution of each of the detection image parts included in the taken detection image to the luminance distribution of corresponding one of the detection image parts of the detection image, and it is possible to improve the extraction accuracy and the detection accuracy of each of the detection image parts included in the taken detection image,
and it becomes possible to improve the extraction accuracy and the detection accuracy of the detection image.

APPLICATION EXAMPLE 3

This application example is directed to the image processing device according to Application Example 1 or 2, wherein the detection image generation section increases the size of the background image if a distribution width of a gray-scale pattern of the luminance of the detection image part included in the taken detection image is larger than a distribution width of a predetermined gray-scale pattern, and a maximum value of the luminance of the detection image part included in the taken detection image fails to fulfill a requirement of the maximum value of the luminance.

In this image processing device, by increasing the size of the background image if the distribution width of the gray-scale pattern of the luminance of the detection image part included in the taken detection image is larger than the distribution width of the predetermined gray-scale pattern, and the maximum value of the luminance of the detection image part included in the taken detection image fails to fulfill the requirement of the maximum value of the luminance, it is possible to easily approximate the luminance distribution of each of the detection image parts included in the taken detection image to the luminance distribution of corresponding one of the detection image parts of the detection image, and it is possible to improve the extraction accuracy and the detection accuracy of each of the detection image parts included in the taken detection image, and it becomes possible to improve the extraction accuracy and the detection accuracy of the detection image.

APPLICATION EXAMPLE 4

This application example is directed to the image processing device according to Application Example 1 or 2, wherein the detection image generation section changes the luminance distribution of each of the detection image parts of the detection image to be generated by changing at least one of an overall size of the detection image part included in detection image, a width of each of the regions included in the detection image part, and a maximum value of the luminance of the detection image part. In this image processing device, by changing at least one of the overall size of each of the detection image parts, the width of each of the regions included in the detection image part, and the maximum value of the luminance of the detection image part, the luminance distribution of each of the detection image parts of the detection image to be generated can be changed, it is possible to approximate the luminance distribution of each of the detection image parts included in the taken detection image to the luminance distribution of corresponding one of the detection image parts of the detection image, and it is possible to improve the extraction accuracy and the detection accuracy of each of the detection image parts included in the taken detection image, and it becomes possible to improve the extraction accuracy and the detection accuracy of the detection image.

APPLICATION EXAMPLE 5

This application example is directed to the image processing device according to any one of Application Examples 1 through 4, wherein sectioning of the regions is obtained based on a predetermined function.

APPLICATION EXAMPLE 6

This application example is directed to the image processing device according to Application Example 5, wherein the function is a Gaussian distribution function. In the image processing device according to one of the application examples 5 and 6, it is possible to easily form the plurality of detection image parts included in the detection image as the detection image parts with the luminance distribution suitable for the detection of the centroid coordinate of each of the detection image parts.

APPLICATION EXAMPLE 7

This application example is directed to a projector adapted to display an image by projecting the image on a projection surface, and including the image processing device according to any one of Application Examples 1 through 6, an imaging section adapted to take the detection image projected on the projection surface, and a projection section adapted to project the image based on image data output from the image processing device.

APPLICATION EXAMPLE 8

This application example is directed to a method of controlling a projector adapted to display an image by projecting the image on a projection surface, and including (a) generating a detection image, which is an image adapted to detect a state of a projection image displayed on the projection surface, and includes a plurality of detection image parts, and a background image adapted to cover respective peripheries of the detection image parts, (b) projecting the detection image on the projection surface, and (c) taking the detection image projected on the projection surface, each of the detection image parts includes a plurality of regions having respective luminance values different from each other, the background image has a luminance value lower than the luminance values of the detection image parts, and in step (a), at least one of a luminance distribution of each of the detection image parts of the detection image to be generated and a size of the background image is changed so that a luminance distribution of each of the detection image parts included in a taken detection image, which is taken in step (c), is approximated to a luminance distribution of corresponding one of the detection image parts of the detection image.

In this method of controlling a projector, the detection image is composed of a plurality of detection image parts and a background image covering the respective peripheries of the detection image parts, and the background image is formed as an image having a lower luminance value than the luminance values of the detection image parts. Therefore, it is possible to inhibit the luminance value of the periphery of the background image from affecting the luminance value of the detection image part. Further, the detection image parts are each formed as an image including a plurality of regions with respective luminance values different from each other, and are therefore advantageous to obtaining the centroid of the detection image part with accuracy. Further, at least one of the luminance distribution of each of the detection image parts of the detection image to be generated and the size of the background image is changed so that the luminance distribution of each of the detection image parts included in the taken detection image is approximated to the luminance distribution of the corresponding one of the detection image parts of the detection image. Therefore, it is possible to improve the extraction accuracy and the detection accuracy of the detection image parts included in the taken detection image, and it becomes possible to improve the extraction accuracy and the detection accuracy of the detection image.

It should be noted that the invention can be put into practice in a variety of aspects such as an image display device, a projector, a method of controlling a projector, a computer program for controlling the projector, or a storage medium storing the computer program.

BRIEF DESCRIPTION OF DRAWINGS

FIG. 1 is a block diagram schematically showing a configuration of a projector as an embodiment of the invention.

FIG. 2 illustrates explanatory diagrams briefly showing the significance of performing a detection image adjustment citing a keystone correction as an example.

FIG. 3 is a flowchart showing a detection image adjustment process in the embodiment.

FIG. 4A is an explanatory diagram showing the detection image generated.

FIG. 4B is an explanatory diagram showing the detection image generated.

FIG. 5 is a flowchart showing a procedure of generating dot patterns as detection image parts constituting the detection image in the step S10 shown in FIG. 3.

FIG. 6 illustrates explanatory diagrams showing an outline of a detection image adjustment process performed using the detection image generated in the step S10 shown in FIG. 3.

FIG. 7 illustrates explanatory diagrams showing extraction of each detection image part in the taken image and a judgment on necessity of correction of the detection image performed by an image analysis section.

FIG. 8 illustrates explanatory diagrams showing an advantage obtained by disposing background images.

FIG. 9 is an explanatory diagram showing an example of a gray-scale pattern of the detection image part extracted and correction information.

FIG. 10 is an explanatory diagram showing an example of a gray-scale pattern of the detection image part extracted and correction information.

FIG. 11 is an explanatory diagram showing an example of a gray-scale pattern of the detection image part extracted and correction information.

FIG. 12 is an explanatory diagram showing an example of a gray-scale pattern of the detection image part extracted and correction information.

FIG. 13A is an explanatory diagram showing a procedure of obtaining a centroid coordinate in the step S60$a$ shown in FIG. 3.

FIG. 13B is an explanatory diagram showing a procedure of obtaining a centroid coordinate in the step S60$a$ shown in FIG. 3.

FIG. 14 is a flowchart showing a procedure of calculating the centroid coordinate in one centroid coordinate calculation target region in the step S330 shown in FIGS. 13A and 13B.

FIG. 15 is an explanatory diagram showing an example of another detection image using dot patterns.

FIG. 16 is an explanatory diagram showing an example of the detection image including other detection image parts different from the dot pattern.

DESCRIPTION OF EMBODIMENTS

A. Configuration of Projector

FIG. 1 is a block diagram schematically showing a configuration of a projector as an embodiment of the invention. The projector PJ is provided with an input operation section 10, a control circuit 20, an image processing operation circuit 30, an image projection optical system (projection section) 40, an imaging section 50, and a motion detection section 60.

The input operation section 10 is composed of, for example, a remote controller, and buttons and keys provided to the projector PJ, wherein the buttons and the keys are not shown in the drawing. The input operation section 10 outputs instruction information corresponding to the operation by the user to the control circuit 20. For example, the instruction information of starting a detection image adjustment process described later is output from the user to the control circuit 20.

The image projection optical system 40 generates image light representing an image, and then images the image light on a screen (a projection surface) SC to thereby project the image in an enlarged manner. The image projection optical system 40 is provided with an illumination optical system 420, a liquid crystal light valve 440, and a projection optical system 460.

The illumination optical system 420 is provided with a light source lamp 422 and a lamp drive section 424. As the light source lamp 422, a variety of types of self-luminescent elements such as a discharge emission light source lamp including, for example, a super-high pressure mercury lamp and a metal halide lamp, a laser source, a light-emitting diode, or an organic electro luminescence (EL) element can be used. The lamp drive section 424 drives the light source lamp 422 based on the control by the control circuit 20.

The liquid crystal light valve 440 is a light modulation device for modulating the light emitted from the illumination optical system 420 based on the image data. The liquid crystal light valve 440 is formed of a transmissive liquid crystal panel having a plurality of pixels arranged in a matrix. By controlling the operation of the liquid crystal of each pixel based on a drive signal from a light valve drive section 380 of the image processing operation circuit 30 described later, the liquid crystal light valve 440 converts the illumination light emitted from the illumination optical system 420 into the image light representing the image. It should be noted that in this embodiment the liquid crystal light valve 440 includes three liquid crystal light valves (not shown) for three color components of red (R), green (G), and blue (B). It should be noted that it is also possible to project a monochrome image using a single liquid crystal light valve.

The projection optical system 460 images the image light emitted from the liquid crystal light valve 440 on the screen SC to thereby project the image on the screen SC in an enlarged manner. The projection optical system 460 is provided with a projection lens 462, a lens drive section 464, and a state detection section 466. The projection lens 462 has a focusing lens for focus adjustment and a zoom lens for zoom adjustment, which are not shown in the drawing, and are configured so as to move in the optical axis direction, and enlarges the image light emitted from the liquid crystal light valve 440 in accordance with the zoom position of the zoom lens, and then images the image light in accordance with the focus position of the focusing lens to thereby project the image represented by the image light on the screen SC in an enlarged manner. The lens drive section 464 changes the position (hereinafter referred to as a "focus position") in the optical axis direction of the focusing lens based on the control by the control circuit 20. Further, the lens drive section 464 changes the position (hereinafter referred to as a "zoom position") in the optical axis direction of the zoom lens. The state detection section 466 detects the focus position of the focusing lens and the zoom position of the zoom lens. It should be noted that since the projection optical system 460 has a typical configuration, the graphical description and the explanation of the specific configuration will be omitted.

The image processing operation circuit 30 is provided with an input processing section 320, an image display processing section 340, an image memory 360, and the light valve drive section 380. Based on the control by the control circuit 20, the input processing section 320 performs A/D conversion on the input image signal supplied from the external device, if necessary, to thereby convert it into a digital image signal, which can be processed by the image display processing section 340. Based on the control by the control circuit 20, the image display processing section 340 writes the image data, which is included in the digital signal output from the input processing section 320, into the image memory 360 frame by frame, and then performs various image processing such as a resolution conversion process or keystone correction process when reading it out therefrom. Further, the image display processing section 340 superimposes detection image data representing the detection image output from a control section 220 on the image data. The light valve drive section 380 drives the liquid crystal light valve 440 with the digital image signal input from the image display processing section 340. It should be noted that it is also possible to arrange that the light valve drive section 380 is provided to the image projection optical system 40, but not to the image processing operation circuit 30.

Based on the control by the control circuit 20, the imaging section 50 takes a projection image, and then outputs the image signal corresponding to the image thus taken to the control circuit 20. The projection image is an image obtained by superimposing the detection image TP (composed of four dot patterns DP as four detection image parts) on the image PP (indicated by hatching) represented by the digital image signal input from the input processing section 320 to the image display processing section 340 as the detection image, and is projected on the screen SC in an enlarged manner. The imaging section 50 is configured using, for example, a CCD camera provided with charge coupled device (CCD) as an imaging element. It should be noted that the detection image will be described later.

The motion detection section 60 detects motions around the projection axis, in a vertical direction and a horizontal direction, and stoppage of the motions in the projector PJ. It should be noted that the motion detection section can be configured using a variety of sensors capable of detecting the motions and the stoppage of the motions, such as an angular velocity sensor, an acceleration sensor, or a gyro sensor.

The control circuit 20 is a computer provided with a CPU, a ROM, and a RAM, and executes a control program to thereby constitute the control section 220 and an information storage section 260. The control section 220 functions as a variety of control function sections for respectively controlling the image processing operation circuit 30, the image projection optical system 40, the imaging section 50, and the motion detection section 60 with the control program thus executed. The information storage section 260 functions as a variety of storage sections for storing the information for the respective control operations. As examples of the control function sections of the control section 220, FIG. 1 shows a detection image adjustment section 230 for performing a detection image adjustment described later, and a projection image adjustment section 240 for performing the adjustment of the image quality of the projection image such as the focus adjustment and the keystone correction (keystone distortion correction). The detection image adjustment section 230 operates by executing the corresponding program in response to the instruction of starting the detection image adjustment input by the user with the input operation section 10. Further, as examples of the storage sections of the information storage section 260, FIG. 1 shows a setting information storage section 262 for storing setting information used for various control operations by the control section 220, a detection image information storage section 264 for storing detection image information described later, and a taken image information storage section 266 for storing the image data of the taken image taken by the imaging section 50.

The detection image adjustment section 230 is provided with a detection image generation section 232, an imaging control section 234, an image analysis section 236, and a centroid coordinate detection section 238. The detection image generation section 232 generates the image data of the detection image used for the focus adjustment and the keystone correction performed by the projection image adjustment section 240. The imaging control section 234 controls the imaging section 50 to take the projection image including the detection image projected on the screen SC, and then stores the projection image (hereinafter also referred to as a "taken image") thus taken into the taken image information storage section 266. The image analysis section 236 analyzes the taken image. It should be noted that the image analysis section 236 can be disposed in the detection image generation section 232. The centroid coordinate detection section 238 detects a centroid coordinate of each of the detection image parts (the dot patterns DP) included in the detection image TP. The focus adjustment is performed using the detection image the centroid coordinates of which are detected, and the keystone correction is performed based on the centroid coordinates thus detected. The detection image adjustment section 230 will further be described later.

It should be noted that in this embodiment the detection image generation section 232 and the image analysis section 236 correspond to a detection image generation section according to the invention. Further, the control circuit 20, the image processing operation circuit 30, and the motion detection section 60 correspond to an image processing device according to the invention.

B. Operation of Projector

Outline of Detection Image Adjustment

FIG. 2 illustrates explanatory diagrams briefly showing the significance of performing the detection image adjustment citing a keystone correction as an example. As shown in (A) in FIG. 2, the rectangular image formed in an image formation area 440f of the liquid crystal light valve 440 is projected on the screen SC in a distorted state due to the relative positional relationship between the projector PJ and the screen SC. On this occasion, it becomes possible to display the image with the distortion corrected by converting the positions of the four vertexes of the projection image with distortion into the positions of four vertexes forming a rectangular shape on the image formation area 440f. Therefore, it is required to accurately obtain where the four vertexes of the projection image are converted on the image formation area 440f due to the coordinate conversion.

It is possible to correspond to the requirement described above with the following process. That is, in the image formation area 440f, the detection image including a plurality of detection image parts (e.g., the four dot patterns indicated by black circles in (B) in FIG. 2) disposed in advance in a known coordinate system is projected. Then, the detection image thus projected is taken, and then the detection image parts (also referred to as "taken detection image parts") are extracted from the detection image (also referred to as a "taken detection image") thus taken including the taken detection image parts. The shift amount is detected by obtaining the centroid coordinate of each of the taken detection image parts thus extracted, and thus, it is possible to perform the coordinate conversion for correcting the image projected with the distortion into a rectangular shape based on the shift amount thus detected. Further, it is possible to obtain each of the projection distances of the respective detection image parts using the three-dimensional measurement method based on the shift amount, and the focus adjustment can also be performed.

Here, assuming that the keystone correction and the focus adjustment have not yet been performed, the extraction accuracy of each of the detection image parts included in the taken detection image is degraded due to the case in which the outer shape is distorted, the case in which the outer shape blurs, and the case in which the brightness is changed. Therefore, if the centroid coordinate is obtained from the detection image part with low extraction accuracy, the accuracy of the centroid coordinate thus obtained is also low. For example, if the detection image part is extracted in the blurred state in which the taken detection image part spreads to be dark, the pixel region to be the target of obtaining the centroid coordinate is spread, and thus the centroid coordinate with great error is obtained.

Therefore, in this embodiment, as explained below, the image corresponding to each of the detection image parts (the taken detection image parts) included in the taken detection image is adjusted so that the centroid coordinate of each of the detection image parts is obtained with accuracy.

Operational Explanation of Detection Image Adjustment

FIG. 3 is a flowchart showing a detection image adjustment process in this embodiment. When the detection image adjustment section 230 (FIG. 1) of the control section 220 starts the detection image adjustment process, the detection image generation section 232 of the detection image adjustment section 230 generates the detection image (step S10). The image data (hereinafter also referred to as "detection image data") of the detection image thus generated is output to the image display processing section 340 (FIG. 1) of the image processing operation circuit 30.

FIGS. 4A and 4B are explanatory diagrams showing the detection image generated. As shown in FIG. 4A, the detection image TP is composed of the dot patterns DP1 through DP4 as the four detection image parts to be disposed at predetermined positions of the four corners of the image formation area 440f of the liquid crystal light valve 440, and rectangular background images BP1 through BP4 respectively covering the dot patterns DP1 through DP4. The image formation area 440f is constituted by a plurality of pixels (the liquid crystal pixels) arranged in a matrix. It is assumed that the coordinates (in the horizontal and vertical directions) of the four vertexes located upper left, upper right, lower left, and lower right of the image formation area

440f are represented by (0, 0), (xx, 0), (0, yy), and (xx, yy), respectively. In this case, it is assumed that the four dot patterns DP1 through DP4 have the respective centers (centroids) disposed at predetermined coordinate positions in the coordinate system of the image formation area 440f. In this embodiment, it is assumed that the dot patterns DP1 through DP4 and the respective background images BP1 through BP4 are arranged so as to have the centers located at positions shifted horizontally W/8 pixels and vertically h/8 pixels from the four vertexes located upper left, upper right, lower left, and lower right of the image formation area 440f, respectively, wherein w is the number of pixels of the image formation area 440f arranged horizontally, and h is the number of pixels thereof arranged vertically. It should be noted that the arrangement positions are not limited thereto, but can arbitrarily be set. However, it is more preferable that the arrangement positions are located closer to the four vertexes.

As shown in FIG. 4B, the dot patterns DP1 through DP4 are each a circular pattern with a dot pattern size (diameter) of sd (unit is, for example, [pixels]), sectioned into a plurality of levels of regions, namely the number of gray levels stp (stp1 through stp4 are each an integer equal to or greater than 3), varying in a direction from the center toward the outer periphery, and each have a multilevel luminance distribution in which the luminance sequentially decreases in a direction from a central region toward an outer region. In the example shown in FIG. 4B, the luminance distribution has a shape emulating the Gaussian distribution. It should be noted that it is assumed that a number n of each of the regions is sequentially assigned as 0 through stp-1 in a direction from the center toward the outside. The number of the region (the center region) with a first level is n=0, and the luminance value (e.g., an 8 bit gray-scale value) thereof is represented by V0, and the radius thereof is represented by r0 (the unit is, for example, [pixels]). Similarly, the number of the region with a second level is n=1, and the luminance value thereof is represented by V1, and the radius thereof is represented by r1 [pixels]. Further, the number of the region with a third level is n=2, and the luminance value thereof is represented by V2, and the radius thereof is represented by r2 [pixels]. Therefore, the number of the region with an n-th level is n=0 through stp-1, and the luminance value thereof is represented by Vn, and the radius thereof is represented by rn [pixels]. It should be noted that in the case in which the number of pixels [pixels] is odd, the size sd of the dot pattern is expressed as sd=(2rn) in a range of -rn through +rn defining the center as 0. In contrast, in the case in which the number of pixels is even, the size sd of the dot pattern is expressed as sd=(2rn)-1 in a range of -rn through +(rn-1), or a range of -(rn-1) through +rn.

FIG. 5 is a flowchart showing a procedure of generating the dot patterns as the detection image parts constituting the detection image in the step S10 shown in FIG. 3. Firstly, determination of the dot pattern size sd (step S110), determination of the number of gray levels stp of the luminance (step S120), and determination of the standard deviation sigma (step S130) are performed. It should be noted that at the beginning of the detection image adjustment, these parameters sd, stp, and sigma are set to values determined in advance. In the explanation below, it is assumed that sd=34 [pixels], stp=10 [levels], and sigma=10 [pixels] are set, as an example of the initial setting values.

Then, the values of the probability density A(0), A(sd/2) in s=0, and s=sd/2, respectively, are calculated (step S140) from the normal distribution function A(s) expressed by the formula (1) below, and then an allocation value Pa for each of the levels of the number of gray levels stp is calculated (step S150) from the allocation formula of the formula (2).

[Math. 1]

$$A(s) = \frac{1}{\sqrt{2\pi}\,\sigma} \exp\left\{-\frac{(s-\text{ave})^2}{2\sigma^2}\right\} \quad (1)$$

[Math. 2]

$$Pa = (A(0) - A(sd/2))/stp \quad (2)$$

In the case of the initial setting of sd=34, stp=10, and sigma=10 described above, A(0)=0.03989 and A(sd/2)=A(17)=0.00940 are obtained from the formula (1) assuming that the average value ave is zero, and Pa=0.00305 is obtained from the formula (2). These numerical values are each described to be rounded off to five decimal places for the sake of convenience. It should be noted that although sd is expressed within the range of -rn through +(rn-1), and the average value is -0.5 instead of 0 in the case in which the size sd of the dot pattern is an even pixel count as explained with reference to FIG. 3, since it is conceivable that there is hardly a computational problem if the range of -rn through +rn is assumed similarly to the case of the odd pixel count, ave=0 is adopted as described above. For example, in the case of sd=34, the difference in calculation value between the case of considering the actual range of -17 through +16 and the case of considering the range of -17 through +17 is about 0.00005 on the maximum value A(0) side, and about 0.00083 on the minimum value A(17) side, which have no problem in treating them as roughly the same values.

Subsequently, the radius rn (n: 0 through stp-1=9) of each of the levels is calculated (step S160). Specifically, the radius rn fulfilling the formula (3) below is calculated.

[Math. 3]

$$A(0) - (n+1)\cdot Pa = A(m) \quad (3)$$

In the case of the initial setting of sd=34, stp=10, and sigma=10 described above, the radiuses r0 through r9 of the respective levels are obtained as r0=4 [pixels], r1=6 [pixels], r2=7 [pixels], r3=9 [pixels], r4=10 [pixels], r5=11 [pixels], r6=12 [pixels], r7=14 [pixels], r8=15 [pixels], and r9=17 [pixels].

Then, the regions of the respective levels are specified (step S170). Specifically, defining the center coordinate of the dot pattern as the origin, the regions of the respective levels are specified based on the formula (4) below. Specifically, the circle with the radius rn expressed by the formula (4) forms a boundary between the regions, and the inner area thereof is specified as each of the regions. Therefore, the area between the circle expressed by $(rn-1)^2 = X^2 + y^2$ and the circle expressed by $rn^2 = X^2 + y^2$ corresponds to the region of the n-th level.

[Math. 4]

$$rn^2 = x^2 + y^2 \quad (4)$$

(x: horizontal pixel position, y: vertical pixel position)

Lastly, the gray-scale value (the luminance value) Vn of the luminance of each of the levels is set (step S180). Specifically, for example, it is possible to set the luminance value Vn of each of the levels based on the formula (5) below.

[Math. 5]

$$Vn = V0 - n\cdot(V0/stp) \quad (5)$$

In the case of the initial setting of sd=34, stp=10, and sigma-10 described above, the luminance values V0 through V9 of the respective regions of the first level (the radius r0) through the tenth level (the radius r9) can be obtained as, for example, V1: 88% white, V2: 78% white, V3: 68% white, V4: 58% white, V5: 48% white, V6: 38% white, V7: 28% white, V8: 18% white, and V9: 8% white if V0: 98% white (the proportion to the maximum gray-scale value of 255 in 8 bits) is assumed.

As described above, the reason of using such dot patterns as shown in FIG. 4B is that the dot patterns are suitable to accurately determine the centroid coordinate in the process of obtaining the centroid coordinate of each of the dot patterns. It should be noted that the process of obtaining the centroid coordinate will be described later.

The background images BP1 through BP4 are set to have a size having width wb and height hb larger than those of the dot-pattern size of the respective dot patterns DP1 through DP4, and the luminance thereof is set to be darker than the darkest luminance in the outermost portion of the respective dot patterns. As described later, the background images are for inhibiting the luminance of the projection image on which the detection image is superimposed from affecting the luminance of the dot patterns, and are preferably set to have the size twice through three times as large as the size of the respective dot patterns in general. It should be noted that the size significantly depends on the resolution of the imaging by the imaging section 50, and is therefore sufficiently 1.5 through 2 times, or required to be more than three times depending of the cases. In this embodiment, it is assumed that, for example, the background images BP1 through BP4 set initially are each a rectangular image having the width wb and the height hb equal to (2sd) and the luminance of 0% white, namely black color.

After the generation of the detection image in the step 10 (FIG. 3) described above, the steps S20 through S60b are executed, and then the process returns to the step S10 to perform the process in the step S10 and the subsequent steps again. Thus, the detection image adjustment is performed. Hereinafter, prior to the specific explanation of the process on and after the step S20, an outline of the detection image adjustment using the detection image generated in the step S10 will firstly be explained.

FIG. 6 illustrates explanatory diagrams showing an outline of a detection image adjustment process performed using the detection image generated in the step S10 shown in FIG. 3. It should be noted that the background images are omitted from the drawing for the sake of eye-friendliness. The detection image TP generated in the step S10 is displayed by projection on the screen SC as shown in, for example, (A) in FIG. 6 in the step S20 described later. On this occasion, it is assumed that the detection image TP displayed by projection is in the state in which the luminance of the dot patterns DP2, DP4 located at upper right and lower right positions is lower than the luminance of the dot patterns DP1, DP3 located at the upper left and lower left positions, and is out of the allowable range of the luminance with which the centroid can accurately be obtained. In this case, imaging of the projection image in the step S30 described later and correction of the detection image in the steps S60b, S10 are performed. As a result, as shown in (B) in FIG. 6, in the detection image TPa displayed by projection due to reprojection of the detection image after the correction in the step S20, the luminance of each of the detection image parts DP1 through DP4 is adjusted so as to fall within the allowable range in which the respective centroid coordinate positions can accurately be obtained.

Then, each of the processes performed on and after the step S20 shown in FIG. 3 will be explained. In the step S20, the detection image TP represented by the detection image data output from the detection image generation section 232 of the detection image adjustment section 230 (FIG. 1) to the image display processing section 340 is superimposed on an image represented by image data output from the input processing section 320 of the image processing operation circuit 30 to the image display processing section 340, and then displayed by projection on the screen SC via the light valve drive section 380 and the image projection optical system 40. Then, in the step S30, the imaging control section 234 of the detection image adjustment section 230 controls the imaging section 50 to take the projection image including the detection image and displayed by projection on the screen SC, and thus the image data (also referred to as "taken image data") of the taken image is acquired, and is then stored in the taken image information storage section 266.

In the step S40, the image analysis section 236 (FIG. 1) of the detection image adjustment section 230 performs extraction of the detection image parts (hereinafter also referred to as "taken detection image parts") in the taken image corresponding to the dot patterns (the detection image parts) DP1 through DP4 constituting the detection image TP on the taken image represented by the taken image data stored in the taken image information storage section 266. Subsequently, in the step S50, whether the extraction of each of the detection image parts is achievable and therefore the correction of the detection image is unnecessary, or the extraction of at least one of the detection image parts is unachievable and therefore the correction of the detection image is necessary is determined.

FIG. 7 illustrates explanatory diagrams showing extraction of each of the detection image parts in the taken image and a judgment on necessity of the correction of the detection image performed by the image analysis section. (A) in FIG. 7 schematically shows the taken image obtained by the imaging, and (B) in FIG. 7 shows the extraction result of one of the detection image parts and the judgment on the necessity of the correction.

The image data of the taken image CPP stored in the taken image information storage section 266 is read out, and the region including the part with the highest luminance indicated by the frame of the dashed-dotted line shown in (A) in FIG. 7 is extracted from the image data of the portion corresponding to the dot patterns DP1 through DP4 as the respective detection image parts of the taken detection image CTP. Specifically, since approximate positions where the detection image parts corresponding to the dot patterns DP1 through DP4 and the background images must exist can be identified, for example, the maximum value of the luminance values of the respective pixels within the approximate range including each of the detection image parts is detected, and then the image data of the region including the pixel with the maximum value of the luminance thus detected, and including the portion of the background image is extracted. The graph of (B) in FIG. 7 shows the state (hereinafter also referred to as a "gray-scale pattern") of the variation in the gray-scale value of the image data thus extracted. The gray-scale pattern Yc indicated by a dotted line in (B) in FIG. 7 represents the gray-scale pattern of the dot pattern set therein, and schematically shows the state of the ideal gray-scale variation in the case of the ideal state without any loss such as a focus loss or a distortion loss. It should be noted that hereinafter the gray-scale pattern Yc is also referred to as a "set gray-scale pattern" of an "ideal gray-scale pattern." However, the gray-scale pattern Ydp of the image data actually extracted gets into the state shifted from the set gray-scale pattern Yc in accordance with a variety of conditions such as the state of the focus shift, the state of zoom, the resolution of the imaging section 50, a positional relationship (front projection, or tilted projection) between the projector and the screen, the condition (e.g., the color and the material) of the screen, or the state of the image on which the detection image is superimposed.

Therefore, whether or not the extraction of each of the detection image parts is achievable is determined by judging whether or not the shift of the gray-scale pattern Ydp of the detection image part from the set gray-scale pattern Yc fulfills the requirements for accurately obtaining the centroid for each of the detection image parts thus extracted, and whether or not the correction of the detection image is necessary. Specifically, the determination is made based on whether or not the following requirements are fulfilled. Requirement 1: The maximum value VHdp of the luminance of the detection image part is within the range of the upper limit value Vah (250 in 8 bits (98% if expressed with the proportion thereof to the maximum gray-scale value of 255)) through the lower limit value Val (230 in 8 bits (90%)). Requirement 2: The luminance values VLadp, VLbdp at the positions 1.5 times outer than the dot pattern size sd are lower than (Val-th) (the threshold value th is equal to 30).

If the requirements 1, 2 are fulfilled in each of the detection image parts, the extraction of each of the detection image parts is achievable, and therefore, it is determined that the correction of the detection image is unnecessary. In contrast, if at least one of the requirements 1, 2 fails to be fulfilled in at least one of the detection image parts, the extraction of the detection image part is unachievable, and therefore, it is determined that the correction of the detection image is necessary. It should be noted that the lower limit value Val and the upper limit value Vah are not limited to Val=230, Vah=250, but are the values which can arbitrarily be changed in accordance with the required accuracy. Further, the threshold value th is also not limited to th=30, but the same applies to the threshold value th.

FIG. 8 illustrates explanatory diagrams showing an advantage obtained by disposing the background images. (A) in FIG. 8 shows an example of the gray-scale pattern of one of the detection image parts assuming that no background image is disposed. (B) in FIG. 8 shows an example of the gray-scale pattern of one of the detection image parts with the background image disposed. If no background image is disposed, the gray-scale pattern Ydp of the detection image part is affected by the condition (the color and the material) of the screen and the state (luminance) of the image on which the detection image is superimposed. If the luminance of the color of the screen is high, or the luminance of the image on which the detection image is superimposed (also referred to as a "superimposition target image") is high, the luminance on the low luminance side such as the set gray-scale pattern Yc fails to be lowered due to the influence of the luminance of the screen or the luminance of the superimposition target image, and therefore, the gray-scale pattern of the detection image part thus extracted becomes a gray-scale pattern biased to the bright side. On this occasion, if there is created the state in which the detection image part is extracted to have the maximum value of the luminance lower than the actual value, the gray-scale difference is reduced to thereby increase the possibility of failing to obtain the accurate centroid. In contrast, if the background image is disposed, since the background image is disposed in the detection image part and the superimposition target image portion as shown in (B) in FIG. 8, it is possible to suppress the influence of the screen and the superimposition target image to thereby approximate the gray-scale pattern Ydp obtained to the set gray-scale pattern Yc. As a result, it becomes possible to improve the extraction accuracy of the detection image parts. As explained hereinabove, the reason of disposing the background images so as to cover the detection image parts is for suppressing the influence of the screen and the superimposition target image to thereby improve the extraction accuracy of the detection image parts.

If all of the states of the gray-scale patterns of the respective detection image parts in the taken image thus obtained fulfill the allowable range, and therefore, it is determined that the correction of the detection image is unnecessary (YES in the step S50), the centroid coordinate detection section 238 (FIG. 1) of the detection image adjustment section 230 obtains the centroid coordinates of the respective detection image parts (the taken detection image parts) in the taken image corresponding to the dot patterns DP1 through DP4 as the detection image parts constituting the detection image TP in the step S60a. Then, based on the centroid coordinates thus obtained here, various adjustments such as the focus adjustment and the keystone correction are further performed. It should be noted that the method of obtaining the centroid coordinates will be explained later.

If at least one of the states of the gray-scale patterns of the respective detection image parts in the taken image thus obtained fails to fulfill the allowable range, and therefore it is determined that the correction of the detection image is necessary (NO in the step S50), the detection image generation section 232 obtains the correction information for correcting the detection image TP in the step S60b (FIG. 3). Then, the process returns to the step S10, the detection image is corrected based on the correction information thus obtained, the image data of the detection image thus corrected is output to the image display processing section 340, and then the process of the steps S10 through S60b is repeated until it is determined in the step S50 that the correction of the detection image is unnecessary. It should be noted that the process (step S60b) of obtaining the correction information will be explained later.

After the determination (step S50) on the necessity of the correction of the detection image, if the process of obtaining the centroid coordinates of the respective detection image parts in the taken image is performed (step S60a), a judgment (step S70) on the necessity of the readjustment of the detection image and a judgment (step S80) on termination of the detection image adjustment process are performed. Unless the termination is instructed from the input operation section 10 by the user, and the termination of the process is determined in the step S80, the standby state is kept (NO in the step S70, NO in the step S80) until it is determined in the step S70 that the readjustment is necessary. If it is determined that the readjustment is necessary (YES in the step S70), the process returns to the step S30, and the imaging of the projection image in the step S30, the extraction of the detection image parts in the step S40, and the judgment on the necessity of the correction of the detection image in the step S50 are performed, and then the process of obtaining the centroid coordinate in the step S60a or the process of obtaining the correction information in the step S60b is performed again in accordance with the result of the judgment on the necessity of the correction. It should be noted that as the case in which it is judged that the readjustment is necessary, there can be cited the case in which the change in the installation state of the projector PJ is detected by the motion detection of the projector PJ performed by the motion detection section 60, and the case in which the setting conditions (e.g., the luminance of the illumination, the zooming position, and the focusing position) of the projector are changed.

Correction Information and Correction of Detection Image

FIGS. 9 through 12 are explanatory diagrams showing examples of the gray-scale pattern of the detection image part extracted and the correction information. FIG. 9 shows the gray-scale pattern Ydp of the characteristic in the case in which the requirement 2 is fulfilled with the same distribution width as that of the set gray-scale pattern Yc, but the maximum value (the highest gray-scale value) VHdp of the luminance becomes lower than the allowable range (Vah through Val) to thereby fail to fulfill the requirement 1. For example, the case in which the detection image part is "darkly extracted" corresponds thereto. In this case, it is possible to make the luminance of the dot pattern brighter in whole. Therefore, the detection image generation section 232 obtains the correction information of "raising the luminance of the dot pattern," and then performs the correction of raising the luminance of the corresponding dot pattern to thereby perform the correction of the detection image. It should be noted that the correction method of the dot pattern will be described later.

FIG. 10 shows the gray-scale pattern Ydp of the characteristic in the case in which the requirement 2 is fulfilled although the width is broader than that of the set gray-scale pattern Yc, but the maximum value VHdp of the luminance becomes lower than the allowable range (Vah through Val) to thereby fail to fulfill the requirement 1. For example, the case in which the detection image part is "darkly extracted with blur" corresponds thereto. In this case, it is conceivable that the maximum value VHdp of the luminance of the gray-scale pattern Ydp runs off the allowable range to thereby fail to fulfill the requirement 1 since the luminance of the background image affects the luminance of the dot pattern due to the blur of the image, and the luminance of the superimposition target image in the periphery of the background image affects the luminance of the dot pattern.

Therefore, in order to resolve the problem described above, it is possible to, for example, increase the size (the width and the height) of the background image with respect to the size of the dot pattern to thereby reduce the influence of the background image and the superimposition target image. Therefore, for example, the detection image generation section 232 obtains the correction information of "increasing the size of the background image with respect to the size of the dot pattern," and then sets a larger size to the background image of the corresponding dot pattern. Specifically, for example, the width wb and the height hb, which are set to be twice as large as the size sd of the dot pattern in the initial setting as described above, are set to be more than two times as large as the size sd.

Here, if the maximum value VHdp of the luminance of the gray-scale pattern Ydp is increased to fulfill the requirement 1 requiring the maximum value to fall within the allowable range (Vah–Val) by performing the process shown in FIG. 10 once or a plurality of times in a repeated manner, it is determined that the extraction of the detection image part is achievable. Further, in the case in which the maximum value VHdp fails to fall within the allowable range (Vah–Val) and fails to fulfill the requirement 1 even if the width of the distribution of the gray-scale pattern Ydp is narrowed to be the same as that of the set gray-scale pattern Yc by repeating the process shown in FIG. 10 a plurality of times, the state shown in FIG. 9 is created. Therefore, as a result, by performing the process shown in FIG. 9, it is determined that the extraction of the detection image part is achievable.

It should be noted that in the case of FIG. 10, it is also possible to perform the correction by setting the luminance in the central portion of the dot pattern to be higher than the luminance in the periphery thereof to thereby make the change in luminance acute. Further, it is also possible to perform both of the process of increasing the size of the background image and the process of setting the luminance of the central portion of the dot pattern to be higher than the luminance of the periphery thereof.

FIG. 11 shows the gray-scale pattern Ydp of the characteristic in the case in which the requirement 2 is fulfilled with the same distribution width as that of the set gray-scale pattern Yc, but the maximum value VHdp of the luminance is the same as the maximum settable value Vc, and has a spread (the width) to thereby fail to fulfill the requirement 1. For example, the case in which the detection image part is "extracted with saturation on the bright side" corresponds thereto. In this case it is possible to slightly decrease the luminance of the dot pattern, or to reduce the size of the dot pattern. It should be noted that the size of the background image, namely the width wb and the height hb thereof, is set to the size (2sd in this embodiment) obtained by increasing the size sd of the dot pattern by multiplying the size sd of the dot pattern by a predetermined magnification ratio as described above. Therefore, reducing the size of the dot pattern corresponds to reducing the size of the background image in terms of the adjustment of the size of the background image. It is sufficient that which one of the process of slightly reducing the luminance of the dot pattern and the process of reducing the size of the dot pattern has priority is set in advance. Further, it is also possible to combine a plurality of processes or to perform all of the processes instead of performing either one of the processes.

Therefore, in the case in which the gray-scale pattern of the detection image part thus extracted is as shown in FIG. 11, the detection image generation section 232 obtains the correction information of, for example, "reducing the size of the dot pattern," and then performs the correction of reducing the dot pattern size sd.

Here, if the saturated state of the maximum value VHdp of the luminance of the gray-scale pattern Ydp is eliminated to fulfill the requirement 1 requiring the maximum value to fall within the allowable range (Vah–Val) by performing the process shown in FIG. 11 once or a plurality of times in a repeated manner, it is determined that the extraction of the detection image part is achievable. In contrast, in the case in which the saturation state of the maximum value VHdp of the luminance is eliminated by repeating the process shown in FIG. 11 a plurality of times, but the maximum value VHdp runs off the allowable range (Vah–Val) to thereby fail to fulfill the requirement 1, since the state shown in FIG. 9 or FIG. 10 is created, as a result, by performing the process shown in FIG. 9 or FIG. 10, it is determined that the extraction of the detection image part is achievable.

FIG. 12 shows the gray-scale pattern Ydp of the characteristic in the case in which the maximum value VHdp of the luminance falls within the allowable range (Vah–Val) to thereby fulfill the requirement 1, but the luminance values VLadp, VLbdp of the gray-scale value Ydp at the positions 1.5 times outer than the dot pattern size sd are higher than the boundary value (Val-th) to thereby fail to fulfill the requirement 2. For example, the case in which the detection image part is "extracted on the bright side with blur" corresponds thereto. In this case, it is conceivable that the luminance of the superimposition target image located in the periphery of the background image affects the luminance of the dot pattern due to the blue of the image to increase the luminance on the dark side of the gray-scale pattern Ydp, and thus the luminance values VLadp, VLbdp exceed the boundary value (Val-th) to fail to fulfill the requirement 2.

Therefore, in order to resolve the problem described above, it is possible to, for example, increase the size of the background image with respect to the size of the dot pattern to thereby reduce the influence of the superimposition target image located in the periphery of the background image. Further, it is also possible to reduce the luminance on the peripheral side without changing the luminance on the central side of the dot pattern. Further, it is also possible to reduce the size of the dot pattern. It is sufficient that which one of the process of relatively enlarging the background image, the process of reducing the luminance on the peripheral side of the dot pattern, and the process of reducing the size of the dot pattern has priority is set in advance. Further, it is also possible to combine a plurality of processes or to perform all of the processes instead of performing either one of the processes.

Therefore, in the case in which the gray-scale pattern of the detection image part thus extracted is as shown in FIG. 12, for example, the detection image generation section 232 obtains the correction information of "increasing the size of the background image with respect to the size of the dot pattern," and then sets a larger size to the background image with respect to the size of the corresponding dot pattern.

Here, it is assumed that the luminance values VLadp, VLbdp of the gray-scale pattern Ydp is lowered to a level lower than the boundary value (Val-th) to thereby fulfill the requirement 2 by performing the process shown in FIG. 12 once or a plurality of times in a repeated manner. In this case, if the maximum value VHdp of the luminance of the gray-scale pattern Ydp also falls within the allowable range (Vah–Val) to thereby fulfill the requirement 1, it is determined that the extraction of the detection image part is achievable. In contrast, in the case in which the maximum value VHdp of the luminance runs off the allowable range (Vah–Val), and is saturated on the bright side to thereby fail to fulfill the requirement 1 by repeating the process shown in FIG. 12 a plurality of times, since the state shown in FIG. 11 is created, by performing the process shown in FIG. 11, it is determined that the extraction of the detection image part is achievable. Further, in the case in which the maximum value VHdp of the luminance of the gray-scale pattern Ydp runs off the allowable range (Vah–Val) to thereby fail to fulfill the requirement 1 by repeating the process shown in FIG. 12 a plurality of times, since the state shown in FIG. 9 or FIG. 10 is created, as a result, by performing the process shown in FIG. 9 or FIG. 10, it is determined that the extraction of the detection image part is achievable.

By correcting each of the detection image parts as described above, each of the detection image parts is corrected to have the state in which the centroid with the required accuracy can be obtained, and the detection image adjustment is performed so that it is determined that the extraction of each of the detection image parts is achievable.

As the correction method of the dot pattern described above, a variety of types of methods can be adopted. For example, in the case of generating the dot pattern as explained with reference to FIGS. 4A, 4B, and 5, it is possible to generate the dot pattern by setting the parameters thereof such as the dot pattern size sd, the number of gray levels stp, the standard deviation sigma, and the luminance value V0 of the center region. Therefore, by changing these parameters, the correction of the dot pattern can be performed. If the dot size sd is increased, the range of application of the normal distribution is increased to thereby increase the distribution quantities of the respective levels. Therefore, the maximum value of the luminance of the taken detection image part tends to be raised. In contrast, if the dot size sd is decreased, the range of application of the normal distribution is decreased to thereby decrease the distribution quantities of the respective levels. Therefore, the maximum value of the luminance of the taken detection image part tends to be lowered. If the number of gray levels stp is increased, the width of each of the levels is decreased, and therefore, the maximum value of the luminance of the taken detection image part is decreased. If the number of gray levels stp is decreased, the width of each of the levels is increased, and therefore, the maximum value of the luminance of the taken detection image part tends to be increased. If the standard deviation sigma is increased, the normal distribution becomes gentler to increase the width of the center region, and thus, the maximum value of the luminance of the taken detection image part tends to be increased. In contrast, if the standard deviation sigma is decreased, the normal distribution becomes steeper to decrease the width of the center region, and thus, the maximum value of the luminance of the taken detection image part tends to be decreased. If the luminance value V0 of the center region is increased, the maximum value of the luminance of the taken detection image part is increased, and if the luminance value V0 of the center region is decreased, the maximum value of the luminance of the taken detection image part is decreased. Therefore, by appropriately setting the values of these parameters in accordance with the correction information described above, it becomes possible to correct the dot pattern so as to create the desired state.

Method of Obtaining Centroid Coordinate

FIGS. 13A and 13B are explanatory diagrams showing a procedure of obtaining the centroid coordinate in the step S60a shown in FIG. 3. FIG. 13A shows a flowchart of the procedure of obtaining the centroid coordinate, and FIG. 13B shows a target region of the centroid coordinate calculation.

As shown in FIG. 13A, the taken image data is read (step S310), and then extraction of the centroid coordinate calculation target region from the taken image data thus read is performed (step S320). Specifically, the process is performed as described below, for example. Since the dot pattern (the detection image part) constituting the detection image is specified with a coordinate, an approximate area Aex such as an area with a half or quarter width or height from the four corners can be identified even in the taken image represented by the taken image data as shown in FIG. 13B. Therefore, the maximum value of the luminance in each of the areas Aex is detected. Further, it is possible to extract the minimum area including the corresponding taken detection image part as the centroid coordinate calculation target region Ag based on the coordinate of the maximum value and the dot pattern size. Then, the calculation of the centroid coordinate is performed (step S330) in each of the centroid coordinate calculation target regions Ag thus extracted.

FIG. 14 is a flowchart showing a procedure of the centroid coordinate calculation in one of the centroid coordinate calculation target regions in the step S330 shown in FIG. 13A. Firstly, the taken image data in the centroid coordinate calculation target region Ag is investigated to obtain (step S410) the maximum value Vmax and the minimum value Vmin of the luminance in the region. Further, the threshold value th is obtained (step S420) using the formula (6) below.

[Math. 6]

$$th = (V\text{max} - V\text{min}) \cdot 0.25 + V\text{min} \tag{6}$$

It should be noted that the formula (6) shows that the value, which is 25% of the difference (Vmax−Vmin) greater than the minimum value Vmin of the luminance in the centroid coordinate calculation target region Ag, is set to the threshold value. It should be noted that the value of percentage of the difference (Vmax−Vmin) is not limited to 25, but can arbitrarily be set in accordance with what is the value set to the minimum luminance of the pixel to be the centroid coordinate calculation target in the centroid coordinate calculation target region Ag.

Then, the comparison between the luminance value V(x, y) of each of the pixels of the centroid coordinate calculation target region Ag and the threshold value th is performed, and if V(x, y)-th>0 is fulfilled, it is determined that the pixel is included in the target of the centroid coordinate calculation, and the accumulating operations expressed in the formulas (7) through (9) below are performed (step S430). The formula (7) means that the luminance values of the pixels determined to be the target of the centroid coordinate calculation are accumulated. The formula (8) means that the product of the x-coordinate value and the luminance value of the pixel determined to be the target of the centroid coordinate calculation is accumulated. The formula (9) means that the product of the y-coordinate value and the luminance value of the pixel determined to be the target of the centroid coordinate calculation is accumulated. It should be noted that the process is repeated (step S440) until the process is performed on all of the pixels in the centroid coordinate calculation target region Ag.

[Math. 7]

$$\text{Sum} = \text{Sum} + V(x,y) \quad (7)$$

[Math. 8]

$$\text{Sum}X = \text{Sum}X + [V(x,y) \cdot x] \quad (8)$$

[Math. 9]

$$\text{Sum}Y = \text{Sum}Y + [V(x,y) \cdot y] \quad (9)$$

Then, if the process of the step S430 has been performed on all of the pixels in the centroid coordinate calculation target region Ag (YES in the step S440), whether or not the value of the parameter Sum is 0 is determined (step S450). If the value of the parameter Sum is 0 (NO in the step S450), it is determined that an error occurs in the calculation of the centroid coordinate (xg, yg), and an error value determined in advance is set as the centroid coordinate (xg, yg). It should be noted that in this case it is also possible to arrange that the flow of obtaining the centroid coordinate is resumed to thereby achieve reduction of the rate of occurrence of the error. In contrast, if the value of the parameter Sum is not equal to 0 (NO in the step S450), the centroid coordinate (xg, yg) is obtained with the formulas (10) and (11) below.

[Math. 10]

$$xg = \text{Sum}X / \text{Sum} \quad (10)$$

[Math. 11]

$$yg = \text{Sum}Y / \text{Sum} \quad (11)$$

It should be noted that the formula (10) means that the x-coordinate value of the centroid is obtained by dividing the integrated value of the product of the x-coordinate value and the luminance value of each of the pixels determined to be the target of the centroid coordinate calculation by the integrated value of the luminance value of each of the pixels determined to be the target of the centroid coordinate calculation. Similarly, the formula (11) means that the y-coordinate value of the centroid is obtained by dividing the integrated value of the product of the y-coordinate value and the luminance value of each of the pixels determined to be the target of the centroid coordinate calculation by the integrated value of the luminance value of each of the pixels determined to be the target of the centroid coordinate calculation.

As explained hereinabove, in the projector according to this embodiment, by performing the correction so that the luminance distribution (the gray-scale pattern) of each of the detection image parts (the taken detection image parts) in the taken image corresponding to the dot patterns as the detection image parts of the detection image fulfills the requirements, the extraction accuracy and the detection accuracy of the detection image can be improved. Specifically, the extraction accuracy of each of the detection image parts can be improved so that the centroid of each of the detection image parts can be obtained with the required accuracy. Further, even in the state in which the focus adjustment is not performed to thereby cause defocus, or the state in which the keystone correction is not performed to thereby cause a distortion in the projection image, the extraction accuracy and the detection accuracy of the detection image can be improved. As a result, it is possible to accurately obtain the centroid of each of the detection image parts of the detection image extracted with accuracy, and it becomes possible to perform a variety of adjustment such as the focus adjustment and the keystone correction with good accuracy.

C. Modified Examples

It should be noted that the invention is not limited to the embodiment described above, but can be put into practice in various forms within the scope of the invention.

1. First Modified Example

In the embodiment described above, the explanation is presented citing the case as an example in which the difference in probability density between the levels is set to have a constant interval using the allocation value determined using the normal distribution function as shown in FIGS. 4A, 4B, and 5, and at the same time the luminance values of the respective levels are set so that the ratios between the luminance values decrease at regular intervals in the generation of the dot patterns as the detection image parts. However, the invention is not limited thereto, but it is also possible to use a linear function with a broken line shape, a quadratic function, or the like instead of the normal distribution function. Further, it is possible to set the luminance values of the respective levels so that the gray-scale values decrease at regular intervals instead of the ratios between the luminance values with the regular intervals, and the regular intervals in the gray-scale values or the ratios are not necessarily required.

Further, it is also possible to perform the correction of the dot patterns by changing a variety of parameters such as the standard deviation, the dot pattern sizes, the number of gray levels, or the luminance value of the center region.

As described above, the generation and the correction of the detection image parts as the dot patterns can be performed using any method providing the detection image parts each including a plurality of regions having the respective luminance values different form each other can be generated and corrected.

2. Second Modified Example

As shown in FIGS. 4A and 4B, in the embodiment described above, the explanation is presented citing the detection image having the four dot patterns disposed at the four corners of the image as the detection image parts as an example. However, the invention is not limited thereto, but a variety of detection images can be used. Hereinafter, some other detection images will be cited.

FIG. 15 is an explanatory diagram showing an example of another detection image using dot patterns. FIG. 15 shows an example having nine dot patterns disposed in a grid. As shown in FIGS. 4A and 15, the detection images having the dot patterns as the detection image parts with the number and the positions changed variously can be used.

FIG. 16 is an explanatory diagram showing an example of the detection image including other detection image parts different from the dot pattern. FIG. 16 shows an example of a line image shaped like a grid. The line image is sectioned into a plurality of regions each having respective luminance values different from each other so that the central portion of the line has a higher luminance value and the outer portion of the line has a lower luminance value, and the background images (indicated by black solid regions in the drawing) are disposed so as to cover the outside of the lines. In the case of the detection image, it is possible to use the parts indicated by the circular frames as the detection image parts. The correction can be performed by changing the width of the background images covering the line image, the width of the lines of the line image, the number of gray levels, the width of each of the levels, the setting value of the luminance of the center region, and so on. As described above, the detection image part is not limited to the dot pattern, but a variety of detection images can be used providing the detection image has a plurality of detection image parts each having a plurality of regions with respective luminance values different from each other.

3. Third Modified Example

The gray-scale patterns of the detection image part and the correction information explained with reference to FIGS. 9 through 12 are nothing more than an exemplification, and the invention is not limited thereto. Providing it is possible to fulfill the requirements 1 and 2 by performing the correction so that the gray-scale pattern of the detection image part thus extracted is approximated to the set gray-scale pattern, any method of the correction can be adopted.

4. Fourth Modified Example

In the embodiment described above, the calculation of the centroid coordinate is not necessarily limited to those using the formulas (10) and (11), but a variety of calculation methods of the centroid coordinate can be used. For example, it is also possible to adopt the average value of the coordinates of the pixels each having a greater luminance value than the threshold value th. Further, it is also possible to adopt the average value of the coordinates of the pixels located in the centroid coordinate calculation target region Ag.

5. Fifth Modified Example

In the embodiment described above, it is assumed that the detection image adjustment is started in response to the instruction issued by the user operating the input operation section 10. However, the invention is not limited thereto, but the detection image adjustment can be started at various timings. For example, it is possible to start the detection image adjustment automatically when starting up the projector. Further, it is also possible to arrange that the detection image adjustment is started automatically in response to the motion detection section 60 detecting the transition of the state of the projector from a resting state to a moving state.

Further, it is assumed that the detection image adjustment is terminated in response to the instruction issued by the user operating the input operation section 10. However, the invention is not limited thereto, but the detection image adjustment can be terminated at various timings. For example, it is also possible to arrange that the detection image adjustment is terminated automatically when a predetermined wait time elapses after the execution of the process of obtaining the centroid coordinate. Further, it is also possible to arrange that the detection image adjustment is terminated when a resting state of the projector lasts for a predetermined period of time after the execution of the process of obtaining the centroid coordinate.

6. Sixth Modified Example

In the embodiment described above, the explanation is presented citing the case of providing the projector with the imaging section an example. However, it is also possible to arrange that the imaging section is provided separately from the projector. Also in this case, the detection image can be corrected in accordance with the image taken by the imaging section provided separately from the projector. Thus, it becomes possible to extract the detection image with accuracy to thereby accurately obtain the centroid coordinate of each of the taken detection image parts corresponding to the detection image parts of the detection image.

7. Seventh Modified Example

In the embodiment described above, the projector PJ converts the light from the illumination optical system 420 into the image light using the liquid crystal light valve 440, which uses the transmissive liquid crystal panel, as the light modulation device. However, it is also possible to use a digital micro-mirror device (DMD), a reflective liquid crystal panel, or the like as the light modulation device.

REFERENCE SIGNS LIST 10 input operation section
20 control circuit
30 image processing operation circuit
40 image projection optical system
50 imaging section
220 Control section
230 detection image adjustment section
232 detection image generation section
234 imaging control section
236 image analysis section
238 centroid coordinate detection section
260 information storage section
262 setting information storage section
264 detection image information storage section
266 taken image information storage section
320 input processing section
340 image display processing section
360 image memory
380 light valve drive section 420 illumination optical system
422 light source lamp
424 lamp drive section
440 liquid crystal light valve
460 projection optical system
462 projection lens
464 lens drive section
466 state detection section
PJ projector
TP, TPa detection image
PP image
DP dot pattern
BP background image
DP1 through DP4 dot pattern (detection image part)
BP1 through BP4 background image
SC screen

The invention claimed is:

1. An image processing device used for a projector adapted to display an image by projecting the image on a projection surface comprising:
   a detection image generation section adapted to generate a detection image, the detection image being an image adapted to detect a state of a projection image displayed on the projection surface, the detection image including: (i) a plurality of detection image parts, and (ii) a background image adapted to cover respective peripheries of the detection image parts, wherein:
   each of the detection image parts includes a plurality of regions having respective luminance values different from each other,
   the background image has a luminance value lower than the luminance values of the detection image parts, and
   the detection image generation section changes a luminance distribution of each of the detection image parts of the detection image to be generated, and a size of each background image corresponding to each of the detection image parts, individually, so that a maximum value and a width of a luminance distribution of each of the detection image parts included in a taken detection image, which is taken by imaging the projection image generated by projecting the detection image projected on the projection surface, is approximated to a maximum value and a width of a luminance distribution of corresponding one of the detection image parts of the detection image.

2. The image processing device according to claim 1, wherein the detection image generation section changes the luminance distribution of each of the detection image parts of the detection image to be generated, and the size of each background image corresponding to each of the detection image parts, individually, so that a gray-scale pattern of the luminance of each of the detection image parts included in the taken detection image fulfills a requirement.

3. The image processing device according to claim 1, wherein the detection image generation section increases the size of the background image if a distribution width of a gray-scale pattern of the luminance of the detection image part included in the taken detection image is larger than a distribution width of a predetermined gray-scale pattern, and a maximum value of the luminance of the detection image part included in the taken detection image fails to fulfill a requirement of the maximum value of the luminance.

4. The image processing device according to claim 1, wherein the detection image generation section changes the luminance distribution of each of the detection image parts of the detection image to be generated by changing at least one of:
   an overall size of the detection image part included in detection image,
   a width of each of the regions included in the detection image part, and
   a maximum value of the luminance of the detection image part.

5. The image processing device according to claim 1, wherein sectioning of the regions is obtained based on a predetermined function.

6. The image processing device according to claim 5, wherein the function is a Gaussian distribution function.

7. A projector adapted to display an image by projecting the image on a projection surface, comprising:
   the image processing device according to claim 1;
   an imaging section adapted to take the detection image projected on the projection surface; and
   a projection section adapted to project the image based on image data output from the image processing device.

8. A method of controlling a projector adapted to display an image by projecting the image on a projection surface, the method comprising:
   (a) generating a detection image, which is an image adapted to detect a state of a projection image displayed on the projection surface, the detection image including: (i) a plurality of detection image parts, and (ii) a background image adapted to cover respective peripheries of the detection image parts;
   (b) projecting the detection image on the projection surface to generate the projection image; and
   (c) taking the projection image projected on the projection surface, wherein:
   each of the detection image parts includes a plurality of regions having respective luminance values different from each other,
   the background image has a luminance value lower than the luminance values of the detection image parts, and
   in step (a), a luminance distribution of each of the detection image parts of the detection image to be generated, and a size of the background image corresponding to each of the detection image parts, is individually changed so that a maximum value and a width of a luminance distribution of each of the detection image parts included in a taken projection image, which is taken in step (c), is approximated to a maximum value and a width of a luminance distribution of corresponding one of the detection image parts of the detection image.

* * * * *